US009201924B1

(12) United States Patent
Fuller

(10) Patent No.: US 9,201,924 B1
(45) Date of Patent: Dec. 1, 2015

(54) PROCESSING PARTIALLY SUPPORTED QUERIES

(71) Applicant: Google Inc., Mountain View, CA (US)

(72) Inventor: Alfred R. K. Fuller, San Carlos, CA (US)

(73) Assignee: GOOGLE INC., Mountain View, CA (US)

( * ) Notice: Subject to any disclaimer, the term of this patent is extended or adjusted under 35 U.S.C. 154(b) by 190 days.

(21) Appl. No.: 14/088,300

(22) Filed: Nov. 22, 2013

Related U.S. Application Data

(60) Provisional application No. 61/729,999, filed on Nov. 26, 2012.

(51) Int. Cl.
*G06F 17/30* (2006.01)

(52) U.S. Cl.
CPC .... *G06F 17/30463* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 2007/0011154 A1* | 1/2007 | Musgrove et al. | 707/5 |
| 2007/0073853 A1* | 3/2007 | Azizi et al. | 709/220 |
| 2008/0109461 A1* | 5/2008 | Birdwell et al. | 707/100 |
| 2008/0177720 A1* | 7/2008 | Mordvinov et al. | 707/4 |
| 2012/0221711 A1* | 8/2012 | Kuesel et al. | 709/224 |
| 2013/0018729 A1* | 1/2013 | Liu | 705/14.54 |

* cited by examiner

*Primary Examiner* — Wilson Lee
(74) *Attorney, Agent, or Firm* — Morgan, Lewis & Bockius LLP

(57) ABSTRACT

A server system having one or more processors and memory receives a first query from a requestor and obtains a first query-processing plan including a first plurality of query-processing steps for processing the query. Supported query-processing steps comprise query-processing steps in a set of supported query-processing steps, and unsupported query-processing steps comprise query-processing steps not in the set of supported query-processing steps. In accordance with a determination that the first plurality of query-processing steps includes one or more of the supported query-processing steps and one or more unsupported query-processing steps including a respective unsupported query-processing step, the server system performs the one or more supported query-processing steps to produce intermediate results and generates a first response to the first query that includes the intermediate results and a representation of the respective unsupported query-processing step. The server system transmits the first response to the requestor.

21 Claims, 14 Drawing Sheets

Entity Database
140

| | Keys 504 | Properties 502 | Content 506 |
|---|---|---|---|
| Entity 0 | 0 | A=0, B=0, C=bar . . . | Entity 0 Content |
| Entity 1 | 1 | A=1, B=0, C=foo7 . . . | Entity 1 Content |
| Entity 2 | 2 | A=0, B=0, C=bar . . . | Entity 2 Content |
| Entity 3 | 3 | A=0, B=1, C=foo7 . . . | Entity 3 Content |
| Entity 4 | 4 | A=1, B=0, C=bar . . . | Entity 4 Content |
| Entity 5 | 5 | A=1, B=0, C=foo1 . . . | Entity 5 Content |
| Entity 6 | 6 | A=1, B=1, C=bar . . . | Entity 6 Content |
| Entity 7 | 7 | A=0, B=1, C=foo1 . . . | Entity 7 Content |

Figure 5A

PROCESSING PARTIALLY SUPPORTED QUERIES

RELATED APPLICATIONS

This application claims priority to U.S. Provisional Patent Application No. 61/729,999 filed Nov. 26, 2012, which is hereby incorporated by reference in its entirety.

BACKGROUND OF THE INVENTION

Server systems frequently receive resource-intensive queries from requestors (e.g., clients and/or applications). To respond to such queries, server systems need to access and search through large data sets. Generating results and responses to complex queries using large data sets can be a time-consuming and resource-intensive process for the server systems. Processing resource-intensive queries at server systems can have detrimental effects on the entire server system. For example, when certain requestors transmit resource-intensive queries to a server system, the resource-intensive queries can monopolize resources (e.g., memory, processing power and functionality, server time etc.) of the server system, which will result in degrading the performance of the server system when responding to queries from other requestors.

SUMMARY

It would be advantageous for server systems to have the capability to address resource-intensive queries without degrading the performance of the server system. One way to achieve this is to use customized indexes of database entries that are adapted for efficiently executing particular types of queries. In this scenario, the efficiency of processing a query is substantially increased if the customized indexes can be used to process the query. However, if specific indexes that are required for the execution of specific queries are absent at the server system, then those specific queries are not fully supported at the server system at that instant in time and thus are frequently very expensive to perform. One possibility for handling an incoming query that is not fully supported is to return an exception (e.g., returning no results or an error message or returning all entities) to the requestors. However, returning an exception to queries that are not fully supported either prevents the requestor from getting results for the query or forces the requestor to perform all of the processing of the query, even if the server system could have performed a part of the query very efficiently using the customized indexes.

Thus, it would be advantageous to enable the server system to partially perform a query that is only partially supported and provide the requestor with information enabling processing of the partially supported query to be completed at the requestor. Thus, when the server system does not support processing a complete query (for example, owing to the inadequacy of query-processing capabilities such as the necessary index(es)), instead of returning exceptions (e.g., error messages or no results) or overwhelming (burdening or overloading) the server system in an attempt to fully process the query, the server system processes only the supported query-processing steps and returns intermediate results (generated based only on the execution of the supported query-processing steps) to the requestor. In order to enable the requestor to process the unprocessed (e.g., unsupported) query-processing step(s) using the intermediate results provided to the requestor by the server system, the server system also returns a representation of the unprocessed (e.g., unsupported) query-processing step(s) to the requestor. Such an approach would enable the requestor to take advantage of the server system to efficiently process the portions of partially supported queries that are supported by the server system and let the requestor make decisions as to the resources that are to be used to process the unsupported portions of the partially supported queries (e.g., determining whether the cost of getting the results to a particular query is worth the benefit of completing processing the particular query), while preventing the server system from being overwhelmed by performing resource-intensive portions of the partially supported queries.

In some embodiments, a method is performed at a server system having one or more processors and memory storing one or more programs for execution by the one or more processors so as to perform the method. The method includes receiving a first query from a requestor and obtaining a first query-processing plan including a first plurality of query-processing steps for processing the query. The respective server system has a set of supported query-processing steps. Supported query-processing steps comprise query-processing steps in the set of supported query-processing steps, and unsupported query-processing steps comprise query-processing steps not in the set of supported query-processing steps. The method further includes, in accordance with a determination that the first plurality of query-processing steps includes one or more of the supported query-processing steps and one or more unsupported query-processing steps including a respective unsupported query-processing step: performing the one or more supported query-processing steps to produce intermediate results and generating a first response to the first query that includes the intermediate results and a representation of the respective unsupported query-processing step. The method further includes transmitting the first response to the requestor.

In some embodiments, a method is performed at a client system having one or more processors and memory storing one or more programs for execution by the one or more processors so as to perform the method. The method includes transmitting a query to a datastore server and receiving a response to the query that includes intermediate results and a representation of one or more unperformed query-processing steps including a respective unperformed query-processing step generated by the datastore server based on the query. The method further includes, after receiving the response, performing the respective unperformed query-processing step on the intermediate results to produce final results for the query.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 5A is a block diagram illustrating an entity database storing information about entities having properties, unique identifiers (keys) and content, in accordance with some embodiments.

DESCRIPTION OF EMBODIMENTS

It will also be understood that, although the terms "first," "second," etc. are used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can, optionally, be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" should be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of responding to queries based on supported query-processing capabilities. In some instances, the term "requestor" is used to refer to an application being executed by a computer system (such as Client 102 or App Server 104) distinct from a server system (such as Datastore Server 106) in the distributed client-server system that processes queries. In other words, the requestor is an application that sends requests to Datastore Server 106.

Figure 1:
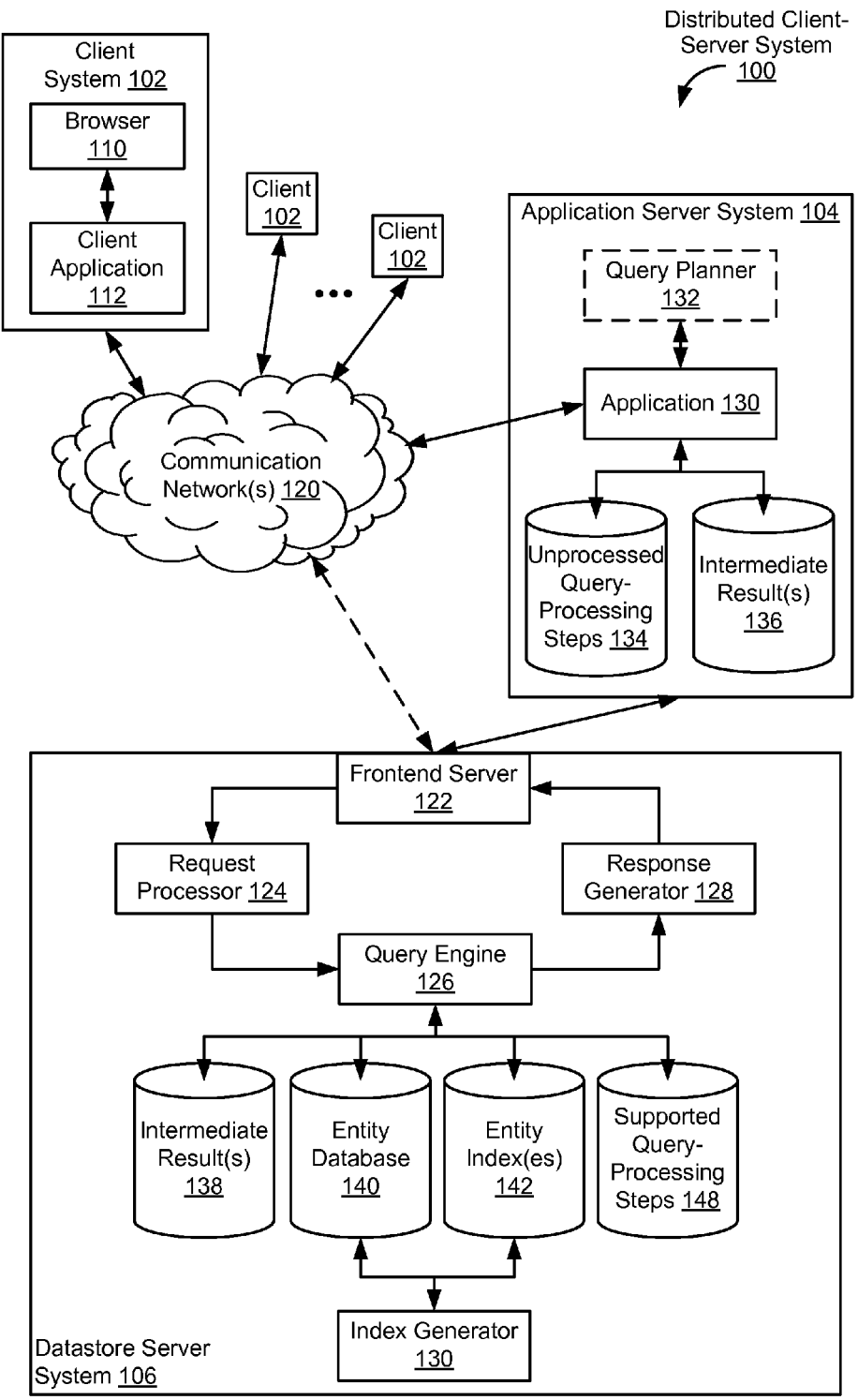
FIG. 1 is a block diagram illustrating a distributed client-server system, in accordance with some embodiments.

FIG. 1 includes a block diagram illustrating an example of a distributed client-server system 100 for performing queries. System 100 includes one or more Client System(s) 102 (also referred to herein as "Client 102"), an Application Server System 104 (also referred to herein as "App Server 104"), a Datastore Server System 106 (also referred to herein as "Datastore Server 106") and a Communication Network 120 for connecting Clients 102 and/or Application Server System 104 to Datastore Server System 106. Communication Network 120 optionally includes the Internet, one or more local area networks (LANs), one or more wide area networks (WANs), other types of networks, or a combination of such networks.

Client 102 optionally includes Browser 110 and/or Client Application 112. Browser 110 can be a general purpose Internet browser (sometimes called a Web browser) having a browser window used for displaying an application interface. A web application for submitting a data request is optionally implemented using hypertext markup language (HTML) or extensible markup language (XML) elements that are rendered by Browser 110. Alternatively, a data request is, optionally, submitted via a standalone Client Application 112. After a user submits a data request through Browser 110 or standalone Client Application 112, Client 102 relays the request to App Server 104 or Datastore Server 106 via Communication Network 120. If the request is relayed to App Server 104, App Server 104 provides a corresponding request to Datastore Server 106. Datastore Server 106 identifies a plurality of matching entities and transfers results including representations of the matching entities and, optionally, a set of display information back to Client 102 or App Server 104. Client Application 112 and/or Browser 110 uses the results and display information to render a set of results at Client 102. As described further in relation to FIG. 2 below, in some embodiments, unprocessed query-processing steps and intermediate result(s) corresponding to the request are transmitted by Datastore Server 106 to Client 102 or App Server 104. In some implementations, Client 102 or App Server 104 (e.g., a query planner) plans the execution of unprocessed query-processing steps on intermediate result(s) to produce a final result.

In some embodiments, App Server 104 includes Application 130, Query Planner 132, Unprocessed Query-Processing Steps 134, and Intermediate Result(s) 136. In some implementations, Application 130 is a backend application for receiving and responding to requests from an application (e.g., Client Application 112) at Client 102. Application 130 transmits data requests to Datastore Server 106 (e.g., to request data for use in responding to a request from an application at Client 102). In some implementations, App Server 104 includes Query Planner 132 that plans the execution of the request and provides a query plan to Datastore Server 106 along with the request. Unprocessed Query-Processing Steps 134 and Intermediate Result(s) 136 are, in some situations, transmitted by Datastore Server 106 to the App Server 104 in response to the request. It should be understood that in some embodiments, requests from Client 102 are transmitted to Datastore Server 106 without an intermediary backend application, while in other embodiments requests from Client 102 are transmitted to Application 130 on App Server 104 and Application 130 communicates with Datastore Server 106. Additionally, in some implementations it is advantageous to handle some client requests without an intermediary backend application at App Server 104, while other client requests are handled by an intermediary backend application (e.g., Application 130).

Datastore Server System 106 includes Frontend Server 122, Request Processor 124, Query Engine 126, Response Generator 128, Index Generator 130, Intermediate Result(s) 138, Entity Database 140, one or more Indexes 142, and Supported Query-Processing Steps 148. Index Generator 130 processes information about the entities that is stored in Entity Database 140 to produce Indexes 142 for use by Query Engine 126 when performing a search query. Alternatively or in addition, Index Generator 130 retrieves information about entities from a remote source such as a remote database or web crawler that systematically retrieves information from a plurality of remote sources (e.g., websites). These operations are typically performed by Index Generator 130 prior to receiving the search query at Datastore Server 106. Performing these processes prior to receiving the search query increases the speed with which search results can be retrieved, thereby reducing latency of the search operation and returning results to users more quickly. In addition, Index Generator 130 typically continues to update Indexes 142 in between queries.

Frontend Server 122 relays requests from Clients 102 to Request Processor 124, which optionally plans a query by selecting an order to apply filters and sort orders specified in the query and transmits the planned query to Query Engine 126. The Request Processor 124 plans the query so as to improve the performance characteristics of the query (e.g., by determining an order to apply filters that reduces the time to perform the query and/or reduces the maximum or total processor usage). Request Processor 124 determines an optimum query-processing plan from candidate query-processing plans and identifies constituent query-processing steps within the query to be executed. Request Processor 124 also identifies unsupported query-processing steps. Query Engine 126 identifies, in Indexes 142, indexes and index portions adapted for responding to the query and performs the query on the identified indexes and/or index portions to identify search results.

Supported Query-Processing Steps 148 are a set of query-processing steps that can be executed by Datastore Server 106 based on the current set of Indexes 142 present at Datastore Server 104 or based on the current set of query-processing capabilities of Datastore Server 106. Intermediate Result(s) 138 are generated by Query Engine 126 by performing one or more Supported Query-Processing Steps 148 on one or more Indexes 142, in response to the query received from Client 102 or App Server 104.

Typically, the matching entities are identified one at a time or in small batches in a predefined order (e.g., an order defined by the query or a system defined order). Thus when the indexes and/or index portions are sorted by a predefined property such as relevance or recency, Query Engine 126 can easily retrieve the twenty most relevant/recent results and then stop searching the identified indexes or index portions.

After identifying matching entities, Query Engine 126 retrieves information about the matching entities from Entity Database 140 and passes the information to Response Generator 128. Response Generator 128 generates a response including at least a portion of the information about the matching entities. Response Generator 128 also, optionally, determines display information for the results. The results and, optionally, display information passed to Frontend Server 122, which in turn passes the results to App Server 104 or to Client 102 via Communication Network 120 for display at Client 102 (e.g., via Browser 110 or Client Application 112).

Figure 2:
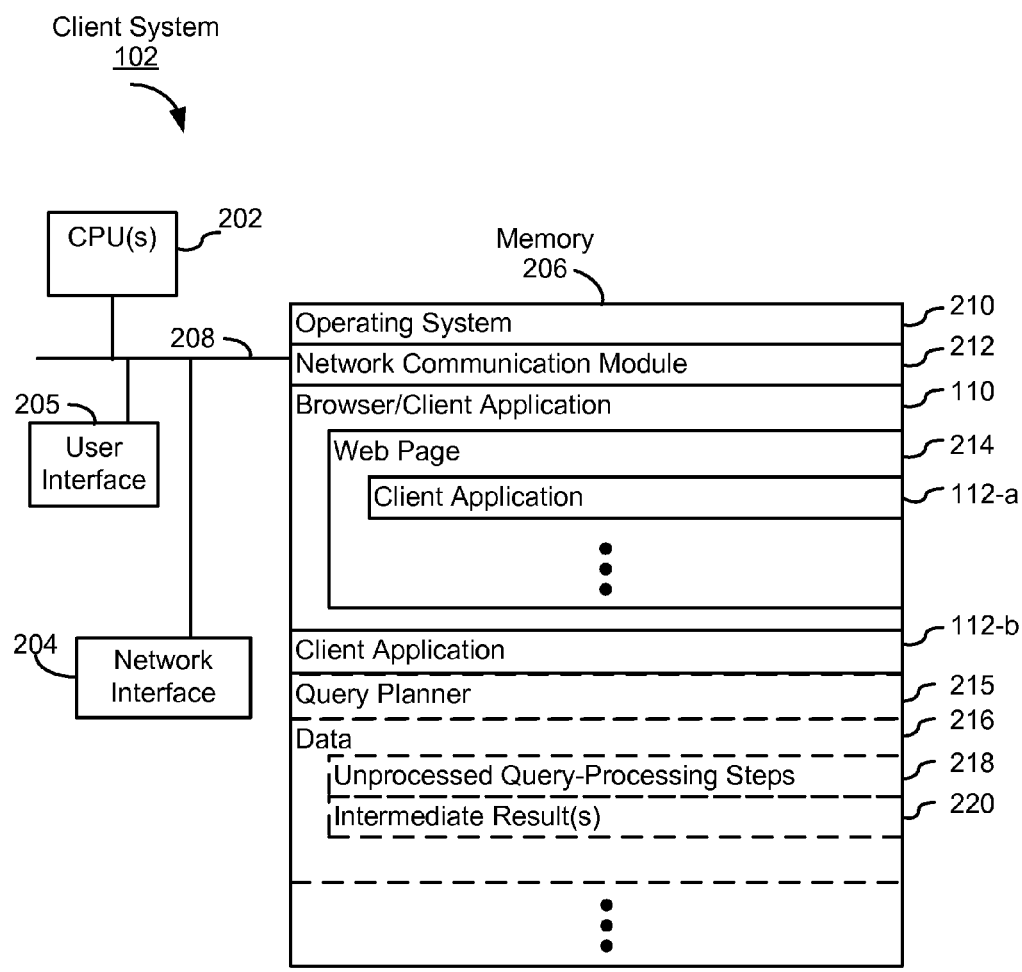
FIG. 2 is a block diagram illustrating a client system, in accordance with some embodiments.

FIG. 2 is a block diagram illustrating a Client System 102 in accordance with some embodiments. Client 102 typically includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:
- an Operating System 210 that includes procedures for handling various basic system services and for performing hardware dependent tasks;
- a Network Communication Module (or instructions) 212 that is used for connecting Client System 102 to other computers (e.g., Application Server System 104, Datastore Server System 106 or Other Message Server Systems 108) via one or more Network Interfaces 204 (wired or wireless) and one or more Communication Networks 120 (FIG. 1), such as the Internet, other wide area networks, local area networks, metropolitan area networks, and so on;
- a Web Browser 110 for loading web pages such as a Web Page 214, which optionally includes code for executing a Client Application 112-a as an embedded application in Web Page 214, where Client Application 112-a sends requests to App Server 104 or Datastore Server 106 and displays data received from App Server 104 or Datastore Server 106, in some implementations Client Application 112-a transmits requests to execute partially supported queries and is the "requestor" described below and in other implementations, Client Application 112-b transmits requests to an intermediary backend application (e.g., Application 130) at App Server 104 which transmits corresponding request(s) to Datastore Server 106;
- a dedicated Client Application 112-b (e.g., a stand-alone email client) for sending requests to App Server 104 or Datastore Server 106 and displaying data received from App Server 104 or Datastore Server 106, in some implementations Client Application 112-b transmits requests to execute partially supported queries and is the "requestor" described below and in other implementations, Client Application 112-*b* transmits requests to an intermediary backend application (e.g., Application 130) at App Server 104 which transmits corresponding request(s) to Datastore Server 106;

optionally, Query Planner 215 for planning the execution of a query at Datastore Server 106 (e.g., generating a set of query-processing steps for executing the query), this query plan includes, in some situations, relative priorities for the query-processing steps (e.g., indicating that some query-processing steps have a higher priority than other query-processing steps). In some implementations, prior to transmitting the query, Client 102 does not have any information indicating whether or not a respective unperformed query-processing step (e.g., a query processing step included in Unprocessed Query-Processing Steps 218) is supported by Datastore Server 106 and thus generates queries for Datastore Server 106 without regard to whether or not the query-processing steps that will be used to perform the query are supported by Datastore Server 106; and optionally, Data 216 such as cached data (e.g., recently accessed results, recent queries, etc.) such as results (including Intermediate Result(s) 220) from one or more prior queries and Unprocessed Query-Processing Steps 218 returned from Datastore Server 106. Client 102 (e.g., using Query Planner 215) optionally performs Unprocessed Query-Processing Steps 218 on Intermediate Result(s) 220 to produce a final result. Unprocessed Query-Processing Steps 218 are query-processing steps not supported by Datastore Server 106, which optionally correspond to operations that Client 102 indicated were low priority operations. Intermediate Result(s) 220 include results generated by Datastore Server 106 by performing a set of one or more supported query-processing steps, which optionally correspond to operations that Client 102 indicated were high priority operations.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 206 optionally stores a subset of the modules and data structures identified above. Furthermore, Memory 206 optionally stores additional modules and data structures not described above.

Figure 3:
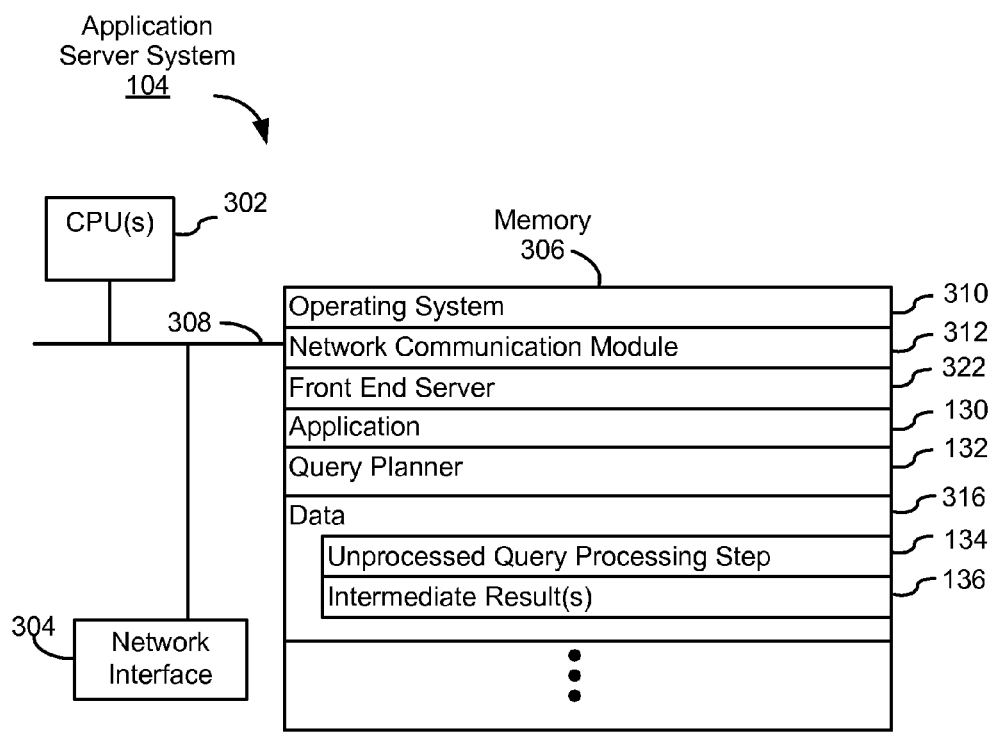
FIG. 3 is a block diagram illustrating an application server system, in accordance with some embodiments.

FIG. 3 is a block diagram illustrating an Application Server System 104 (also referred to herein as "App Server 104") in accordance with some embodiments. App Server 104 typically includes one or more processing units CPU(s) 302, one or more network or other Network Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

an Operating System 310 that includes procedures for handling various basic system services and for performing hardware dependent tasks;

a Network Communication Module (or instructions) 312 that is used for connecting App Server 104 to other computers (e.g., Client 102 and Datastore Server 106) via one or more Network Interfaces 304 (wired or wireless) and one or more Communication Networks 102 (FIG. 1), such as the Internet, other wide area networks, local area networks, metropolitan area networks, and so on;

a Frontend Server 122 for coordinating communication between App Server 104, Clients 102, Datastore Server 106 and any other computer systems with which App Server 104 communicates;

Application 130 for communicating with Datastore Server 106 and serving as an intermediary backend application for a client application at Client 102, in some implementations Application 130 transmits requests to execute partially supported queries and is the "requestor" described below;

Query Planner 132 for planning the execution of a query at Datastore Server 106 (e.g., generating a set of query-processing steps for executing the query), this query plan includes, in some situations, relative priorities for the query-processing steps (e.g., indicating that some query-processing steps have a higher priority than other query-processing steps). In some implementations, prior to transmitting the query, App Server 104 does not have any information indicating whether or not a respective unperformed query-processing step (e.g., a query processing step included in Unprocessed Query-Processing Steps 134) is supported by Datastore Server 106 and thus generates queries for Datastore Server 106 without regard to whether or not the query-processing steps that will be used to perform the query are supported by Datastore Server 106; and Data 316 such as cached data (e.g., recently accessed results, recent queries, etc.), such as results (including Intermediate Result(s) 136) from one or more prior queries and Unprocessed Query-Processing Steps 134 returned from Datastore Server 106. App Server 104 (e.g., using Query Planner 132) optionally performs Unprocessed Query-Processing Steps 136 on Intermediate Result(s) 136 to produce a final result. Unprocessed Query-Processing Steps 134 are query-processing steps not supported by Datastore Server 106, which optionally correspond to operations that App Server 104 indicated were low priority operations. Intermediate Result(s) 136 include results generated by Datastore Server 106 by performing a set of one or more supported query-processing steps, which optionally correspond to operations that App Server 104 indicated were high priority operations.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which are, optionally, present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an Application Server System 104 and how features are allocated among them will vary from one implementation to another, and optionally depends in part on the amount of data traffic that the system must handle during peak usage periods as well as during average usage periods.

Figure 4:
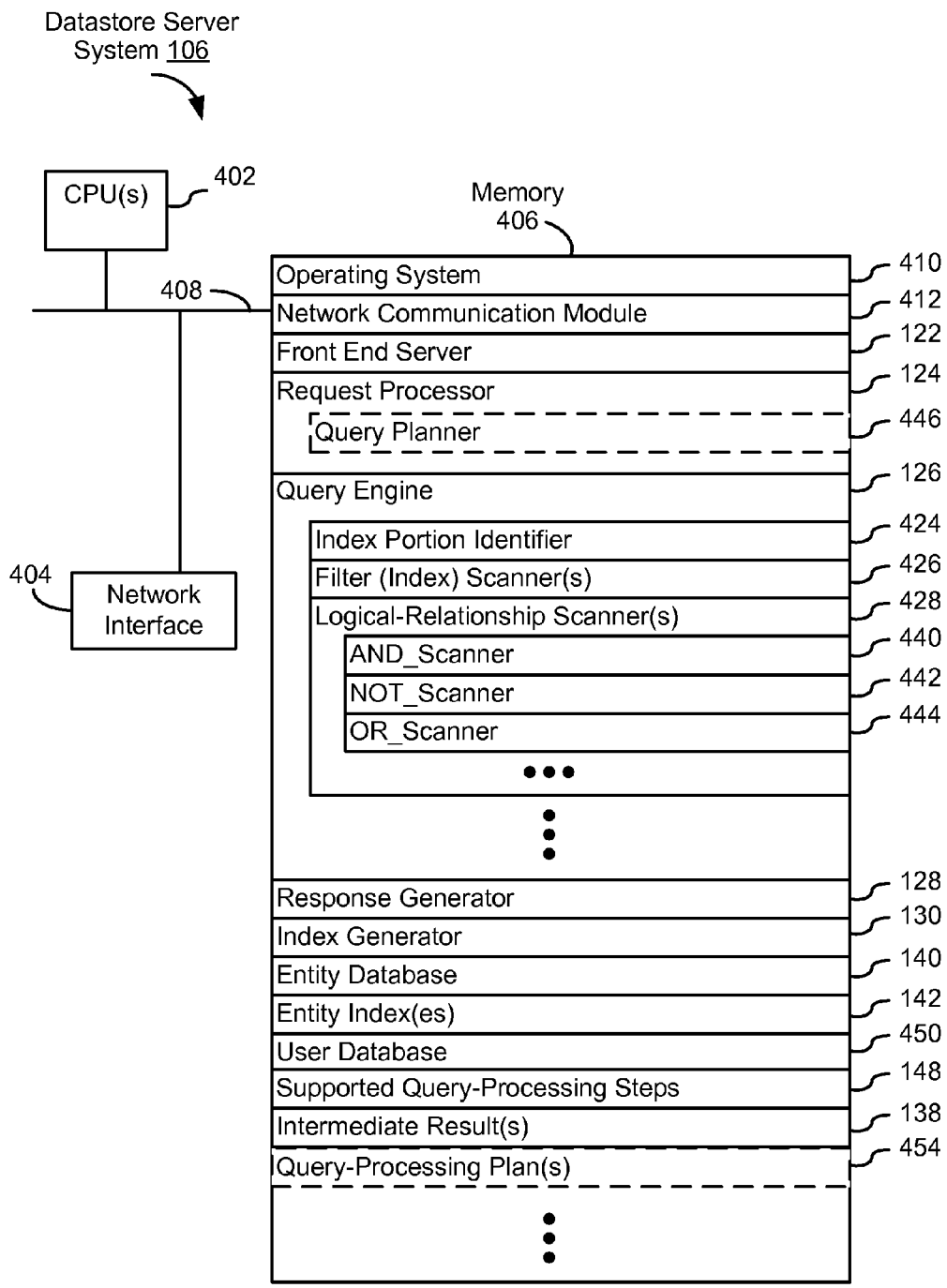
FIG. 4 is a block diagram illustrating a datastore server system, in accordance with some embodiments.
Figure 5B:
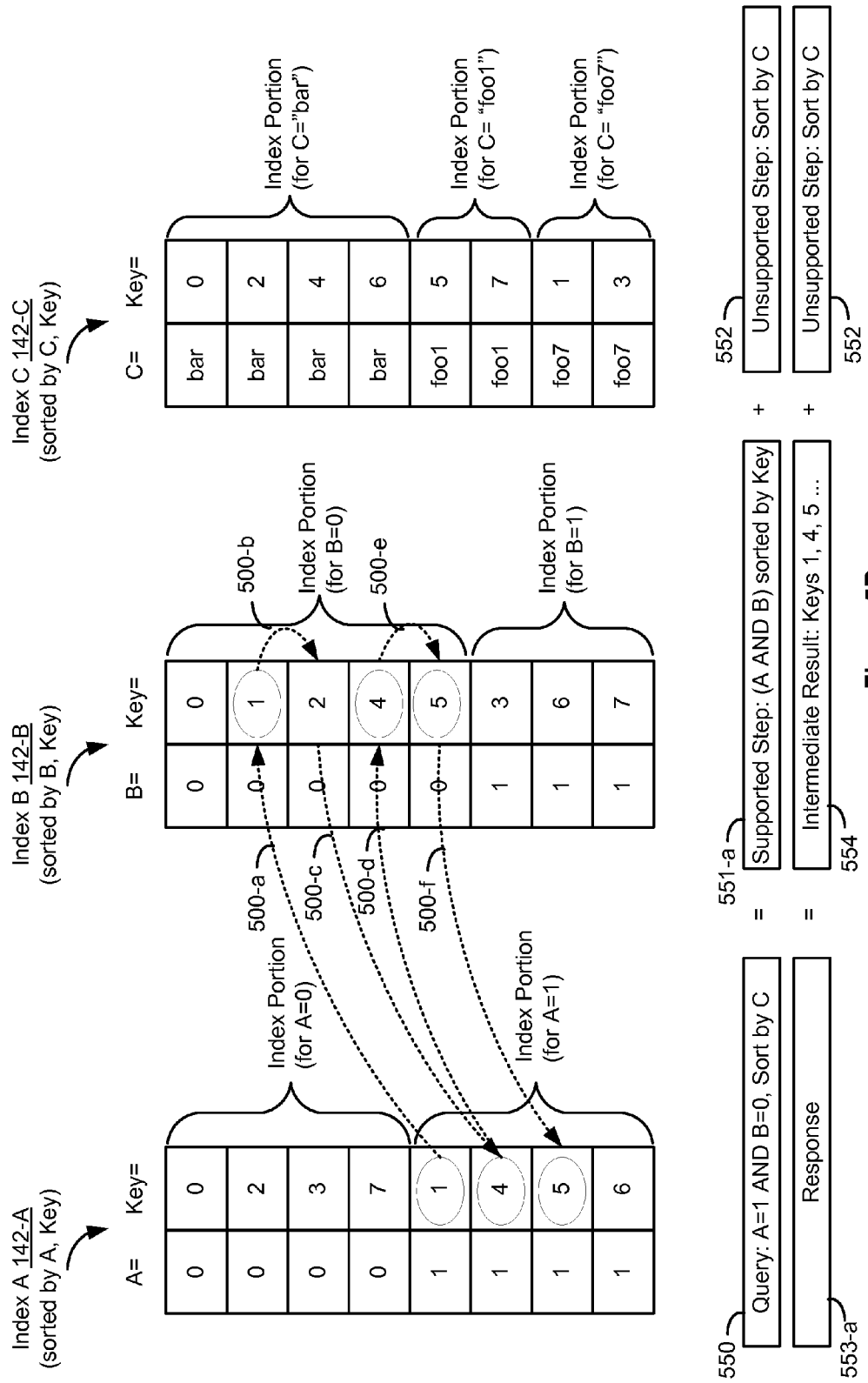
FIG. 5B is a block diagram illustrating execution of a query using a set of indexes for different properties for a plurality of entities having multiple properties and unique identifiers (keys), in accordance with some embodiments.
Figure 5C:
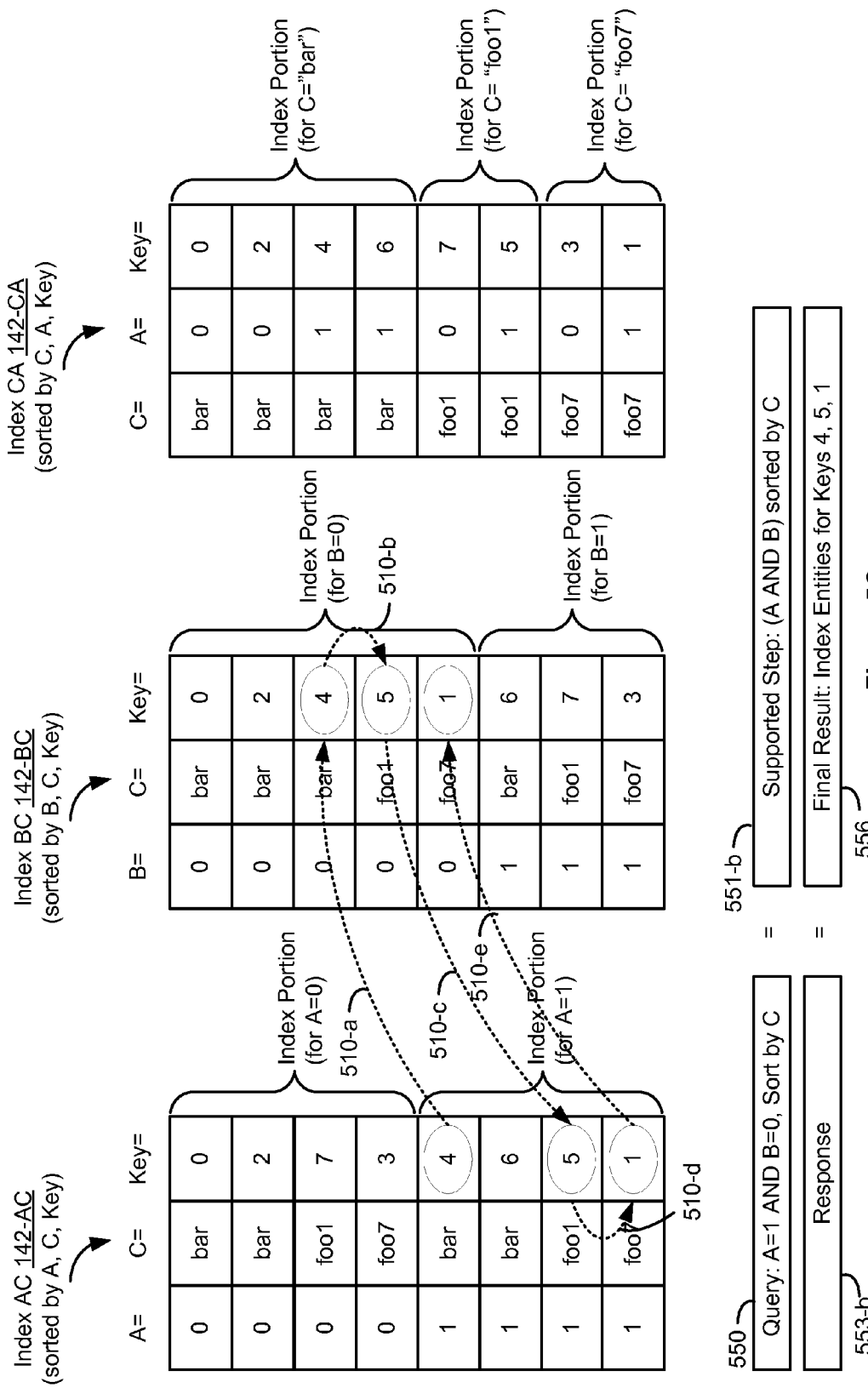
FIG. 5C is a block diagram illustrating execution of a query using a set of indexes for different properties for a plurality of entities having multiple properties and unique identifiers (keys), where the indexes are sorted in accordance with values of one of the properties, in accordance with some embodiments.

FIG. 4 is a block diagram illustrating a Datastore Server System 106 (also referred to herein as "Datastore Server 106") in accordance with some embodiments. Datastore Server 106 typically includes one or more processing units CPU(s) 402, one or more network or other Communications Interfaces 408, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

- an Operating System 410 that includes procedures for handling various basic system services and for performing hardware dependent tasks;
- a Network Communication Module (or instructions) 412 that is used for connecting Datastore Server 106 to other computers (e.g., Client 102, App Server 104) via one or more Network Interfaces 404 (wired or wireless) and one or more Communication Networks 102 (FIG. 1), such as the Internet, other wide area networks, local area networks, metropolitan area networks, and so on;
- a Frontend Server 122 for coordinating communication between Datastore Server 106, Clients 102, App Server 104 and any other computer systems with which Datastore Server 106 communicates;
- a Request Processor 124, optionally including Query Planner 446, for generating a query plan for processing a query received from Client 102 or App Server 104 into a query to be executed by Query Engine 126; for multi-step queries, the converting optionally includes revising the order and/or composition of the steps so as to improve the speed and/or efficiency of performing the query (e.g., by reducing the number of required index scans and/or performing steps that are likely to eliminate a large number of non-matching entities earlier in the process);
- a Query Engine 126 for performing the query by identifying index portions and searching the index portions using the query;
  - an Index Portion Identifier 424 for identifying index portions that are adapted for responding to a query (e.g., index portions that match all of the filters of a query and are sorted in same sort order, such as a sort order specified by the query);
  - one or more Filter (Index) Scanners 426 for scanning through an index or index portion to retrieve an identifier of one or more next matching results (e.g., matching index entries that are sequentially adjacent to the last matching index entry in the sort order) in the index or index portion;
  - one or more Logical-Relationship Scanners 428 for retrieving identifiers of matching entities from the index portions identified by Index Portion Identifier 424 in accordance with the received query, the Logical-Relationship Scanners 428 typically include one or more of an AND_Scanner 440 (described in greater detail below with reference to FIGS. 5A-5B), a NOT_Scanner 442 and an OR_Scanner;
- a Response Generator 128 for organizing information concerning matching entities identified by Query Engine 126 and generating display information to be transmitted to Client 102 or App Server 104, where the display information specifies formatting of the search results at Client 102;
- an Index Generator 130 for generating indexes for use in executing search queries, in some implementations Index Generator 130 generates a large number of indexes (e.g., at least one index for each property that can be used to sort and/or filter search results), or a large index with a large number of different portions, so that for each possible combination of filters and sort orders in a search query, there exists an index including an index portion where the index entries matching the combination of filters are arranged in a contiguous block of index entries sorted in the sort order;
- optionally, an Entity Database 140 storing entities or information about entities;
- one or more Indexes 142 which store information about entities and properties of the entities, typically the Indexes 142 are each sorted in accordance with values of the properties for the entities, as described in greater detail below with reference to FIGS. 5A-5C;
- optionally, a User Database 450 storing information about users and user query preferences, in some embodiments when the entities are user specific (e.g., a collection of a user's photos, emails or other documents), the user database identifies which entities and indexes the user has authority to access, the User Database 450, optionally, stores other user account information;
- Supported Query-Processing Steps 148 corresponding to a set of query-processing steps that can be executed by Datastore Server 106 based on the current set of Indexes 142 present at Datastore Server 106 or based on the current set of query-processing capabilities of Datastore Server 106. In some circumstances whether or not a particular query-processing step is supported in a query plan depends on which other query-processing steps are already being performed as part of the query plan (e.g., a query plan can include "filtering by A, filtering by B and sorting by C," or "filtering by A and sorting by B,"

but not "filtering by A, sorting by B and sorting by C" and thus "sorting by C" is a supported query-processing step when the query plan already includes "filtering by A and filtering by B" but is an unsupported query-processing step when the query plan already includes "filtering by A and sorting by B");

Intermediate Result(s) 138 generated by Query Engine 126 by performing one or more Supported Query-Processing Steps 148 using one or more Indexes 142, based on the query received from Client 102 or App Server 104; and optionally, Query-Processing Plan(s) 454 (e.g., generated by Query Planner 446 or a query planner at Client 102 or App Server 104) including at least a subset of Supported Query-Processing Steps 148 and optionally one or more unsupported query-processing steps to be performed at App Server 104 or Client 102. Optionally, a candidate Query-Processing Plan is selected from a plurality of Query-Processing Plans 454 for the execution of a query received from Client 102 or App Server 104 based on predefined criteria such as preferences of a requestor and/or estimated efficiency of alternative query-processing plans.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which are, optionally, present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server System 106 and how features are allocated among them will vary from one implementation to another, and optionally depends in part on the amount of data traffic that the system must handle during peak usage periods as well as during average usage periods.

ENTITIES AND INDEXES

FIG. 5A illustrates an entity database storing information about entities (data objects) having keys 402 (unique identifiers), properties 404 and content 406 of the entities according to some embodiments. An entity has one or more properties, each property having one or more possible values of different types, including one or more of: integers, floating point values, strings, dates, and binary data. A property can have one or more values. For example, the property "tag" for a particular entity could have a value for each tag associated with the particular entity (e.g., "vacation" "mom" "California," etc. could all be values for the property "tag"). A property with multiple values can have values of mixed types (e.g., for a particular entity a property could have one value that is an integer and another value that is a string). In some implementations, a search query including a filter (e.g., property=value) for a property with multiple values tests whether any of the values meets the filter. Thus, in these implementations, if a respective entity includes properties A=1 and A=2, a search for all entities with the property A=1 will return the respective entity. Additionally, it should be understood that the values of these properties can be used either as predefined sort parameters or to determine whether respective entities meet filter criteria.

Each entity also has a key that uniquely identifies the entity, also called a "unique identifier" for the entity. In some implementations, a key is simply an Entity ID that is associated with the entity (e.g., assigned by Datastore Server 106). In other implementations the key includes a kind and the Entity ID. The kind categorizes the entity so that it can more easily be identified and retrieved. An entity can be requested by Client 102, and/or by App Server 104 either by submitting a request for an entity associated with a particular key, or by requesting performance of a search query that matches the entity's properties. A search query that matches the entities properties will typically first produce the key for the matching entity and then retrieve the entity or information representative of the entity from Entity Database 140. Unlike some conventional relational databases, in some implementations, Entity Database 140 does not require that all entities of a given kind have the same properties.

FIG. 5B illustrates examples of Indexes 142 for different properties for a plurality of entities having multiple properties and unique identifiers (keys). The indexes (Index A 142-A, Index B 142-B and Index-C 142-C) illustrated in FIG. 5B are for responding to queries that do not have custom (user specified or system specified) sort order. Thus, each index has a plurality index entries (rows) sorted in accordance with values of a property and a key (columns). In some implementations, there is an index entry for each value of a property of an entity. Thus, if there is a multi-valued property, there will be at least two index entries for the entity (e.g., two index entries in the same index with the same key but different filter values), one sorted in accordance with the first value of the property and another sorted in accordance with the second value of the property.

Each of the example indexes in FIG. 5B is adapted for responding to queries including a filter for the respective property included in the index (e.g., A, B, or C for Index A 142-A, Index B 142-B or Index C 142-C, respectively). The indexes include portions that are indicated by the values of the property. For example, Index A 142-A has two portions, a portion where A=0 and a portion where A=1, and these portions are internally contiguous portions (e.g., a contiguous set of index entries where A=0 and a contiguous set of index entries where A=1) because Index A 142-A is sorted in accordance with the values of property A. Similarly, Index B 142-B also has two portions, a portion where B=0 and a portion where B=1, and these portions are internally contiguous portions (e.g., a contiguous set of index entries where B=0 and a contiguous set of index entries where B=1) because Index B 142-B is sorted in accordance with the values of property B. Index C 142-C is sorted in a similar manner, but has three different portions because there are three different values for property C, the portions for Index C 142-C include: a portion where C=bar, a portion where C=foo1, and a portion where C=foo7, and these portions are internally contiguous portions because Index C 142-C is sorted alphabetically in accordance with the values of property C. Also, it should be understood that each of the index portions are internally sorted in a default sort order (e.g., the index entries within a portion are sorted by key, which is not typically a user selected sort order, as the values of the keys are not usually known by the user and frequently do not correspond to any property that is relevant to the user).

When a search query is received, indexes are selected to execute the query based on the properties that are included in the index. Moreover, when processing a query specifying a filter, Datastore Server 106 (or Query Engine 126 of Datastore Server 106) only needs to look for index entries matching the query in the portion of the index matching the filter, because the index is sorted so that index entries in all other sections of the index do not match the filter and thus are irrelevant to the query. For example, for a query including the filter A=0, results (e.g., identifiers of index entries) will only be retrieved from the portion of Index A that corresponds to A=0, and the portion of Index A where A=1 will be ignored. Thus, in some embodiments, for each property for which a query can be performed, there is an index that is sorted in accordance with values of that property.

In one implementation, Datastore Server 106 provides services for a plurality of different applications, and each application has its own set of indexes for performing queries. In these implementations each application defines its indexes in a configuration file. Additionally, indexes for some types of commonly received queries are optionally provided automatically by Datastore Server 106. During development of the application, Datastore Server 106 can automatically add suggestions for new indexes to create to the configuration file when it encounters a query that cannot be performed because indexes adapted for performing the query have not been created. Additionally, a developer of the application can manually specify indexes to be created in anticipation of queries that are likely to be executed by the application. As the entities in Entity Database 140 are updated, Datastore Server 106 (or Index Generator 130) updates the indexes (e.g., by updating the values for properties for the entities when the entities are modified). When a user requests that the application execute a query, the query is passed to Datastore Server 106, which generates results using indexes corresponding to the query.

In some circumstances, multiple index portions will be used to respond to a single query (e.g., when a query such as A=1 AND B=1, A=1 NOT B=1, or A=1 OR B=1 is performed both Index A 142-A and Index B 142-B are used to respond. When multiple indexes are used, it is important for many of the embodiments described herein that the index portions used to perform the query are all sorted in a same sort order, as will be described in greater detail below. In cases where there is no sort order specified by the query, a default sort order can be used. For example, in FIG. 5B, all of the index portions are sorted by primary key in ascending order. However, when a custom sort order (e.g., sorting by values of one or more of the properties, such as date or relevance) is part of the query, the indexes must include indexes with index portions sorted in the custom sort order.

As such, the query-processing capabilities of Datastore Server 106 at any given point in time are enabled by or depend on the indexes present at Datastore Server 106 at that point in time. Consequently, if specific indexes—such as indexes with index portions sorted in the custom sort order—that are required for the execution of specific queries or query-processing steps—such as queries that include custom sort orders—are absent at Datastore Server 106, then those specific queries or query-processing steps are determined to be unsupported queries or query-processing steps at Datastore Server 106 at that point in time. For example, the indexes shown in FIG. 5B do not support sorting results by values of C. Thus, in the example illustrated in FIG. 5B, for any query that includes a query-processing step of sorting by C would be partially supported, with "sort by C" as an unsupported query-processing step (provided that at least one of the other query-processing steps were supported).

FIG. 5C illustrates example Indexes 142 for different properties for a plurality of entities having multiple properties and unique identifiers (keys), where the indexes are sorted in a custom sort order (e.g., sorted by values of C). The indexes (Index AC 142-AC, Index BC 142-BC) illustrated in FIG. 4C are for responding to queries that have a custom sort order (e.g., sorted alphabetically by values of property C). This custom sort order is merely an example and it should be understood that a set of indexes can be generated that is adapted for responding to search queries that have any custom sort order on values of any property or any combination of values of different properties (e.g., date descending and relevance descending). Thus, each index has index entries (rows) sorted in accordance with values of two properties and a key (columns). In some implementations, there is an index entry for each combination of values of properties of an entity. Thus, if there is a multi-valued property, there will be at least two index entries for the entity (e.g., two index entries in the same index with the same identifier but different filter values), one sorted in accordance with the first value of the property and another sorted in accordance with the second value of the property.

Each of the example indexes in FIG. 5C is adapted for responding to queries including a filter for the respective property included in the index (e.g., A or B for Index AC 142-AC or Index BC 142-BC, respectively). Index 142-AC includes portions that are indicated by the values of A and are sorted in a sort order in accordance with values of property C and key (e.g., Index AC 142-AC is sorted in accordance with a postfix of the form (C, key)). Index 142-BC includes portions that are indicated by the values of B and are sorted in a sort order in accordance with values of property C and key (e.g., Index BC 142-BC is sorted in accordance with a postfix of the form (C, key)). Index 142-CA includes portions that are indicated by the values of C and are sorted in a sort order in accordance with values of property A and key (e.g., Index CA 142-CA is sorted in accordance with a postfix of the form (A, key)). For example, similar to Index A 142-A in FIG. 5B, Index AC 142-AC has two portions, a portion where A=0 and a portion where A=1, and these portions are internally contiguous portions because Index A 142-AC is sorted in accordance with the values of property AC. However, unlike Index A 142-A, where the index portions were sorted only by key, in Index AC 142-C the index portions are sorted by values of property C and key, or a "postfix" in the form (C, key).

In an analogous manner, similar to Index B 142-B in FIG. 5B, Index BC 142-BC also has two portions, a portion where B=0 and a portion where B=1, and these portions are internally contiguous portions because Index BC 142-BC is sorted in accordance with the values of property BC. However, unlike Index B 142-B, where the index portions were sorted only by key, in Index BC 142-C the index portions are sorted by values of property C and key, or a "postfix" in the form (C, key). In an analogous manner, similar to Index C 142-C in FIG. 5B, Index CA 142-CA also has three portions, a portion where C=bar, a portion where C=foo1, and a portion where C=foo7, and these portions are internally contiguous portions because Index CA 142-CA is sorted in accordance with the values of property C. However, unlike Index C 142-C, where the index portions were sorted only by key, in Index BC 142-C the index portions are sorted by values of property A and key, or a "postfix" in the form (A, key). Thus, the sort order of several of the index portions in FIG. 5C is different from the sort order of the index portions in FIG. 5B.

As described in greater detail above, in some circumstances, multiple index portions will be used to respond to a single query (e.g., when a query such as A=1 AND B=1 (sort by C), A=1 NOT B=1 (sort by C), or A=1 OR B=1 (sort by C) is performed both Index AC 142-AC and Index BC 142-BC are used to respond to the query. While this simple example has been provided with respect to indexes having a single filter criterion and a single sort order, it should be understood that, in principle, a set of indexes can be created that is adapted for responding to a query with any combination of filter criteria and sort orders. For example, Datastore Server 106 can generate or create additional index(es), such that the additional index(es) enable additional query-processing capabilities including the capability to support one or more previously unsupported query-processing steps.

More generally, for a query having one or more filters and zero or more sort orders, an index adapted for responding to the query will include a column for each property used in a filter or sort order. The rows are sorted by the following aspects, in order: property values used in equality filters property values used in inequality filters property values used in sort orders. Additionally, it should be understood that a given index could be adapted for responding to multiple different queries. For example the index adapted for responding to a query of the form: A=value, B=value, C=value, sort by D and E would also be adapted for responding to a query of the form: A=value, B=value, sort by C, D and E or responding to a query of the form: A=value, B=value, C=value, D=value, minvalue<E<maxvalue.

While, in many circumstances, this index generation scheme will entail the creation of a large number of indexes so that there is an index adapted for performing each of the likely queries that can be requested by a client, there are certain advantages to maintaining this set of indexes. For instance, the sorting of the indexes puts all index entries matching every possible query that uses an index in consecutive rows in the index. Consequently, once a first index entry is found that matches all of the filters of a query, all of the index entries in the index that match the query will be ordered consecutively in the index in the sort order of the index. Thus, Datastore Server 106 can quickly identify subsequent matching index entries without searching through the whole index (e.g., by sequentially stepping through index entries row by row). Moreover, if the next index entry in the index does not match all of the filters, then Datastore Server 106 has confirmation that the index does not contain any other matching index entries. As a result of using the index generation scheme described herein will usually result in a substantial increase in efficiency and speed when performing a query at the cost of some additional processing to generate the indexes prior to receiving the query.

However, given the large number of indexes that are likely created to account for all of the possible queries that could be submitted to Datastore Server 106, it is advantageous in some implementations to specify a subset of properties (unindexed properties) that will not be searched on. This will decrease the amount of computing resources that are used to generate, update and store the indexes, because Datastore Server 106 will not need to maintain index entries for the unindexed properties in the indexes.

In the following descriptions, reference will occasionally be made to an identifier that is "sequentially adjacent" to an identifier in an index portion or set of index portions. As used herein, a second identifier in an index portion or set of index portions is "sequentially adjacent" to a first identifier (e.g., a previously retrieved identifier), even when the first identifier is not present in the index portion or set of index portions, when the second identifier is the next higher identifier, for ascending order, or the next lower identifier, for descending order, in the index portion or set of index portions that matches the filter(s) of the second operand (e.g., in the sequence 1, 4, 6, 9, 13, the value "9" is sequentially adjacent to "7" in the ascending direction and the value "6" is sequentially adjacent to "7" in the descending direction). For example, in the index portion of index 142-A where A=0 in FIG. 5B, the key "2" is sequentially adjacent to "3" in the descending direction and the key "5" is sequentially adjacent to "3" in the ascending direction. Similarly, the in the index portion of index 142-B in FIG. 5B where B=0, the key "2" is sequentially adjacent to "3" in the descending direction and the key "4" is sequentially adjacent to "3" in the ascending direction.

Responding to a Query Based on a Set of Supported Query-Processing Steps

Two examples of executing an example query "A=1 AND B=0, sort by C" are described below. The final result of this query is an ordered list of entity identifiers (e.g., keys) that includes only entities that have the values of A=1 and B=0, where the ordered list is sorted by the values of C for the entities. The first example, which generates intermediate results and an unsupported query-processing step, describes executing the example query using the index portions (Index A 142-A and Index B 142-B) previously described with reference to FIG. 5B. The second example, which generates a final result, describes executing the example query using the index portions (Index AC 142-AC and Index BC 142-BC) previously described with reference to FIG. 5C.

Query-processing steps are determined to be "supported" versus "unsupported" by the datastore server system in the context of existing indexes present at the datastore server. Existing indexes enable the datastore server to support a set of query-processing capabilities that would not be readily present without the indexes. For example, as described previously, when a custom sort order (e.g., sorting by values of one or more of the properties, such as date or relevance) is part of a query, to execute the query, Datastore Server 106 must have indexes with index portions sorted in the custom sort order. As such, the query-processing capabilities of Datastore Server 106 at any given point in time are enabled by or depend on the indexes present at Datastore Server 106 at that point in time. Consequently, if specific indexes—such as indexes with index portions sorted in the custom sort order—that are required for the execution of specific queries—such as queries that include custom sort orders—are absent at Datastore Server 106, then those specific queries are determined to be unsupported queries at Datastore Server 106 at that point in time.

Additionally, query-processing steps are determined to be "supported" versus "unsupported" by Datastore Server 106 in the context of a specific query-processing plan. As such, query-processing steps that are supported according to one query-processing plan are, in some situations, not supported according to another query-processing plan. For example, as will be explained below with regard to FIGS. 5B-5C, the query-processing step 'Sort by C' is supported in itself based on Index C 142-C. Thus, if requestor requests all entities sorted by C, then Datastore Server 106 would search Index C 142-C to retrieve entities corresponding to keys 0, 2, 4, 6, 5, 7, 1, 3 in order. However, the query-processing step 'Sort by C' following (or in conjunction) with the query-processing step (A=1 AND B=0) is not supported by the Indexes 142 shown in FIG. 5B, as there is no way to apply both the filters and perform a sort step in a single pass through the indexes. Rather, in order to sort the intermediate results by C, the entities would need to be pulled into memory and sorted using a conventional sort algorithm, which can be a very memory and processor intensive task if there are a large number of results in the intermediate results.

As described above, the query-processing capabilities (including the set of "supported" query-processing steps) of Datastore Server 106 are enabled by or depend on the indexes present at Datastore Server 106. Thus, query-processing steps are determined to be "supported" based whether indexes are readily available at Datastore Server 106 to enable resource-efficient or optimized processing of the query-processing steps. One measure of resource-efficiency in query-processing is that when a query can be performed by a single pass through sorted index portions, the time for query-processing scales with the number of results retrieved whereas in many conventional query processing techniques, the time for query-processing scales with the number of entries or entities searched. For this reason, in some circumstances "supported" query-processing steps can also be referred to as "optimized" query-processing steps or "enhanced-efficiency" query-processing steps, or "resource-efficient" query-processing steps. Similarly, "unsupported" query-processing steps can also be referred to as "non-optimized" or "non-enhanced-efficiency" or "resource-intensive" query-processing steps.

In the first example shown in FIG. 5B, the execution of an example Query 550 (A=1 AND B=0, Sort by C) is demonstrated. As shown in FIG. 5B, the Indexes 142 available to process Query 550 are Index A 142-A, Index B 142-B, and Index C 142-C. Based on the Indexes 142 present in the first example, a query-processing plan for processing Query 550 is generated that includes two steps: Supported Step 551-*a* ((A AND B) sorted by Key) which can be executed using Index A 142-A and Index B 142-B (or portions thereof) as explained below and Unsupported Step 552 (Sort by C).

Supported Step 551-*a* ((A AND B) sorted by Key) is performed on Index A 142-A and Index B 142-B. For execution of Supported Step 551-*a*, Datastore Server 106 starts with the first value in the index portion of Index A 142-A where A=1. In this example, Datastore Server 106 starts at the first index entry in the index portion of Index A 142-A where A=1 which corresponds to Key=1. Using the Key (e.g., Key=1) obtained from the index portion of Index A 142-A where A=1, Datastore Server 106 proceeds (500-*a*) to traverse the portion of Index B 142-B where B=0 to look for an entry with Key≥1. Upon finding an index entry where Key=1 in the portion of Index B 142-B where B=0, Datastore Server 106 identifies Entity 1 (corresponding to Key=1) as a valid match for Supported Step 551-*a* and updates Intermediate Result 554 indicating that the entity with Key=1 is a match (e.g., because index entries with Key=1 were found in the relevant portions of all of the indexes used to perform the supported query-processing step).

Continuing the example from FIG. 5B, Datastore Server 106 continues the search within the current index portion of Index B 142-B where B=0 and then progresses (500-*b*) to the next entry in the current index portion where Key is greater than 1, in this example and the key for the next index entry is Key=2. While the present example describes continuing to scan within the current index portion, in principle any of the index portions used for the search query could be used as a starting point for the next segment of processing the search query. Using the new minimum key (e.g., Key=2), Datastore Server 106 proceeds (500-*c*) to search the portion of Index A 142-A where A=1 to locate an index entry for Key≥2.

Upon finding no match for Key=2 in the portion of Index A 142-A where A=1, the entity with Key=2 is determined not to match the search query (e.g., because the entity with Key=2 does not include a property with A=1). Additionally, Datastore Server 106 identifies the next entry in the current index portion (e.g., the portion of Index A 142-A where A=1) with Key≥2. In the example shown in FIG. 5B, the next entry in the current index portion is the index entry with Key=4. Using the new minimum key (e.g., Key=4), the Datastore Server 106 proceeds (550-*d*) to search through the portion of Index B 142-B where B=0 to find an index entry for Key≥4. Upon finding an index entry where Key=4 in the portion of Index B 142-B where B=0, Datastore Server 106 identifies Entity 4 (corresponding to Key=4) as a valid match for Supported Step 551-*a* and updates Intermediate Result 554 indicating that the entity with Key=4 is a match (e.g., because index entries with Key=4 were found in the relevant portions of all of the indexes used to perform the supported query-processing step).

Proceeding along in the example from FIG. 5B, Datastore Server 106 continues the search within the current index portion of Index B 142-B where B=0 and then progresses (500-*e*) to the next entry in the current index portion where Key is greater than 4, in this example and the key for the next index entry is Key=5. Using the new minimum key (e.g., Key=5), Datastore Server 106 proceeds (500-*f*) to search the portion of Index A 142-A where A=1 to locate an index entry for Key≥5. Upon finding an index entry where Key=5 in the portion of Index A 142-A where A=1, Datastore Server 106 identifies Entity 5 (corresponding to Key=5) as a valid match for Supported Step 551-*a* and updates Intermediate Result 554 indicating that the entity with Key=5 is a match (e.g., because index entries with Key=5 were found in the relevant portions of all of the indexes used to perform the supported query-processing step).

The query execution process described above has been executed over a small number of index entries for ease of understanding, however the advantages of this approach are more readily apparent when executing queries on large sets of data, where skipping between indexes based on a current minimum key (or postfix) as described above can result in skipping hundreds or thousands of index entries. For example, if the index portion where B=0 has two consecutive index entries where Key=1 and Key=1000, while the index portion where A=1 has an index entry for entities with Key=1 through K=1000, skipping between Index A 142-A and Index B 142-B as shown above would result in 989 index entries in the index portion where A=1 while still successfully identifying the entities with Key=1 and Key=1000 as matching Supported Step 551-*a*.

In the example shown in FIG. 5B, Intermediate Result 554 includes Keys 1, 4, and 5. If these entities were to be further sorted by C to perform Unsupported Step 552 described in the example in FIG. 5B, the correct order of Keys would be 4, 5, and 1 (as shown in Index C 142-C). However, because Datastore Server 106 does not have indexes that enable the entities matching A=1 AND B=0 to be identified in an order sorted by C, the entities have merely been identified in a default sort order (in this example, in ascending order by Key).

While Datastore Server 106 could theoretically perform a conventional sort algorithm to sort the intermediate results at this point, doing so could be very resource-intensive and thus will, in many situations, be avoided so as to prevent the sort algorithm from monopolizing the computational-resources of Datastore Server 106. As explained further in relation to FIG. 8, an unsupported or unperformed query-processing step (in this example, Unsupported Step 552 (Sort by C)) has unconstrained resource requirements—i.e., the unperformed or unsupported query-processing step would require an unknown amount of processing power that cannot be calculated by Datastore Server 106 a-priori. For instance, in the example shown in FIG. 5B, Datastore Server 106 would not be able to calculate a-priori the amount of power required to execute Unsupported Step 552 (Sort by C) using the existing Indexes 142. In the simplified example of FIG. 5B, the results include only three entries, but in reality, the intermediate results could include significantly larger data sets. In general, Datastore Server 106 will not perform query-processing steps that might cause Datastore Server 106 to be overwhelmed or overloaded (or place an excessive demand on its resources, such as processing power, time, memory etc.) or that will degrade the ability of Datastore Server 106 to enforce isolation across requests (e.g., reducing the impact of any one request on other requests by Datastore Server 106 by preventing the request from monopolizing the resources of Datastore Server 106).

After generating Intermediate Result 554, Datastore Server 106 generates Response 553-*a* including Intermediate Result 554 (e.g., including Keys 1, 4, and 5) and the Unsupported Step 552 (e.g., Sort by C). Datastore Server 106 transmits Response 553-*a* to the requestor. The requestor, in turn, performs Unsupported Step 552 on Intermediate Result 554 to generate a final result. While sending the requestor incompletely processed results along with information indicating that how to complete the processing causes the requestor to utilize additional resources to finish executing the query, this approach has several advantages for the requestor. As a preliminary matter, producing intermediate results is more helpful to the requestor than producing no results, which would be an alternative way to enforce fairness when executing queries. Additionally, the enforcement of fairness by Datastore Server 106 by refusing to execute unsupported query-processing steps means that other requestors will not be monopolizing Datastore Server 106, so that Datastore Server 106 is available to respond to the requestor. Furthermore, in situations where the requestor has a processing budget at Datastore Server 106 (e.g., either a predefined limit of available compute cycles or processing time or price based on compute cycles or processing time used), passing computationally-intensive query-processing steps back to the requestor prevents the requestor from inadvertently exceeding the budget.

Now, consider the example shown in FIG. 5C. Datastore Server 106 has Indexes 142 sorted by two properties and then by Key (e.g., Indexes AC 142-AC is sorted by A, C, and by Key; Index 142-BC is sorted by B, C, and by Key; and Index CA is sorted by C, A, and by Key). The Indexes 142 described in the example of FIG. 5C could be created, for example, by Datastore Server 106 to support additional query processing steps that were not supported by Datastore Server 106 prior to the creation of the additional set of Indexes 142 described in FIG. 5C. For example, if Datastore Server 106 determined that requestors frequently requested results sorted by C, Datastore Server 106 could undertake the task (or be instructed to undertake the task) of generating the indexes shown in FIG. 5C, which enable filtering and sorting by C to be supported query-processing steps in the same query-processing plan.

The same (or logically equivalent) Query 550 (A=1 AND B=0, Sort by C) as described in the example in FIG. 5B is considered for purpose of illustration in relation to FIG. 5C to illustrate the differences in processing a query using the indexes in FIG. 5B and the indexes in FIG. 5C. Based on the Indexes 142 present in the second example (FIG. 5C), Query 550 is determined to include Supported Step 551-*b* ((A AND B) sorted by C) which can be executed using Index AC 142-AC and Index BC 142-BC (or portions thereof) as explained below. In contrast, as shown in FIG. 5B, sort by C is an unsupported step when using Index A 142-A and Index B 142-B. While Supported Step 551-*b* is referred to as a single supported step herein because it is performed in a single pass through Index AC 142-AC and Index BC 142-BC, Query 550 could also be considered to have multiple supported steps (e.g., "A=1 AND B=0" and "sort by C").

Supported Step 551 ((A AND B) sorted by Key) is performed on Index AC 142-AC and Index BC 142-BC. For execution of Supported Step 551-*b*, Datastore Server 106 starts with the first value in the index portion of Index AC 142-AC where A=1. In this example, Datastore Server 106 starts at the first index entry in the index portion of Index AC 142-AC where A=1 which corresponds to C='bar' and Key=4 (i.e., postfix=(bar, 4)). Using the Key obtained from the index portion of Index AC 142-AC where A=1, Datastore Server 106 proceeds (510-*a*) to traverse the portion of Index BC 142-BC where B=0 to look for an entry with postfix≥(bar, 4) Upon finding an index entry where C='bar' and Key=4 in the portion of Index BC 142-BC where B=0, Datastore Server 106 identifies Entity 4 (corresponding to Key=4) as a valid match for Supported Step 551-*b* and updates Final Result 556 indicating that the entity with Key=4 is a match (e.g., because index entries with postfix=(bar, 4) were found in the relevant portions of all of the indexes used to perform the supported query-processing step). Datastore Server 106 can skip directly to the index entry where C=bar and Key=4, thereby avoiding the cost of evaluating index entries with postfix< (bar, 4) (e.g., the first two index entries in Index BC 142-BC in FIG. 5C).

Referring again to the example from FIG. 5C, Datastore Server 106 continues the search within the current index portion of Index BC 142-B where B=0 and then progresses (510-*b*) to the next entry in the current index portion with postfix>(bar, 4), in this example the key for the next index entry is Key=5 (corresponding to C='foo1'). While the present example describes continuing to scan within the current index portion, in principle any of the index portions used for the search query could be used as a starting point for the next segment of processing the search query. Using the new minimum postfix (in the current example, postfix=(foo1, 5)), Datastore Server 106 proceeds (510-*c*) to search the portion of Index AC 142-AC where A=1 to locate an index entry for postfix≥(foo1, 5). In this example, only one index entry in the portion of Index BC 142-BC where B=0 has a value of C='foo1.' However, if more than one entry in the portion of Index BC 142-BC where B=0 has a value of C='foo1,' then the values of the keys of the corresponding index entries (with value of C='foo1') would be used to break the tie, e.g., the lowest value of Key in the portion of Index BC 142-BC where B=0 and C='foo1,' would be identified as the new minimum key and the corresponding value of postfix would be considered the new minimum postfix of the form (C, Key). In other words, as described in greater detail above, Index BC 142-BC is sorted in accordance with a postfix of the form (C, key).

Upon finding an index entry where postfix=(foo1, 5) (i.e., C='foo1' and Key=5) in the portion of Index AC 142-AC where A=1, Datastore Server 106 identifies Entity 5 (corresponding to Key=5) as a valid match for Supported Step 551-*b* and updates Final Result 556 indicating that the entity with Key=5 is a match (e.g., because index entries with postfix=(foo1, 5) were found in the relevant portions of all of the indexes used to perform the supported query-processing step). Note that, in this example, Datastore Server 106 does not have to consider the index entry in Index AC 142-AC with postfix (bar, 6), because that index entry is less than the current minimum postfix (foo1, 5). In principle, any number of index entries could be skipped in an analogous manner.

Further, in the example from FIG. 5C, Datastore Server 106 continues the search within the current index portion of Index AC 142-AC where A=1 and then progresses (510-*d*) to the next entry in the current index portion where postfix> (foo1, 5). In this example the key for the next index entry is Key=1 (corresponding to C='foo7'). Using the new minimum postfix (foo7, 1), Datastore Server 106 proceeds (510-*e*) to search the portion of Index BC 142-BC where B=0 to locate an index entry for postfix≥(foo7, 1). Upon finding an index entry where postfix=(foo7, 1) in the portion of Index A 142-A where A=1, Datastore Server 106 identifies Entity 1 (corresponding to Key=1 and C='foo7') as a valid match for Supported Step 551-*b* and updates Final Result 556 indicating that the entity with Key=1 is a match (e.g., because index entries with Key=1 were found in the relevant portions of all of the indexes used to perform the supported query-processing step).

In the example shown in FIG. 5C, Final Result 556 includes Keys 4, 5, and 1. These entities are obtained in order, sorted by C. Consequently, Final Result 556 corresponds to the final result to Query 550. Note that in the example shown in FIG. 5C, the multiple query-processing steps (namely, 'A=1 AND B=0' and 'Sort by C') are executed—efficiently—as one combined operation, rather than as two separate operations. In particular, in the example illustrated in FIG. 5B, the keys for matching entities are retrieved from Indexes ordered by Key, ascending (e.g., 1, 4, 5) while in the Example illustrated in FIG. 5C the keys for matching entities are retrieved ordered by C, ascending (e.g., 4 (C=bar), 5 (C=foo1), 1 (C=foo7)). Thus, in the example of FIG. 5C, Datastore Server 106 does have the capabilities (or Indexes) to support Query 550, including Supported Step 551-*b* ((A AND B) Sorted by C). Alternatively, it could be said that sorting by C is a supported query-processing step in FIG. 5C, while sorting by C (when combined with filters) is not a supported query-processing step in FIG. 5B. After generating Final result 566, Datastore Server 106 generates Response 553-*b* including Final Result 556 (e.g., including Keys 4, 5, and 1) Datastore Server 106 transmits Response 553-*b* to the requestor.

While FIGS. 5A-5C have been described with reference to examples that have been simplified to better highlight particularly relevant aspects of the described query execution techniques, in reality, queries are more complex (queries can be expressed using a virtually unlimited number of combinations of multiple filter parameters and sort orders). Also, in many common use cases, indexes will generally be much larger and contain a significantly large number of index entries, as the advantages provided by the query execution techniques described above are most substantial when executing queries against large databases.

Responding to a Query Based on a Set of Supported Query-Processing Steps

Figure 6A:
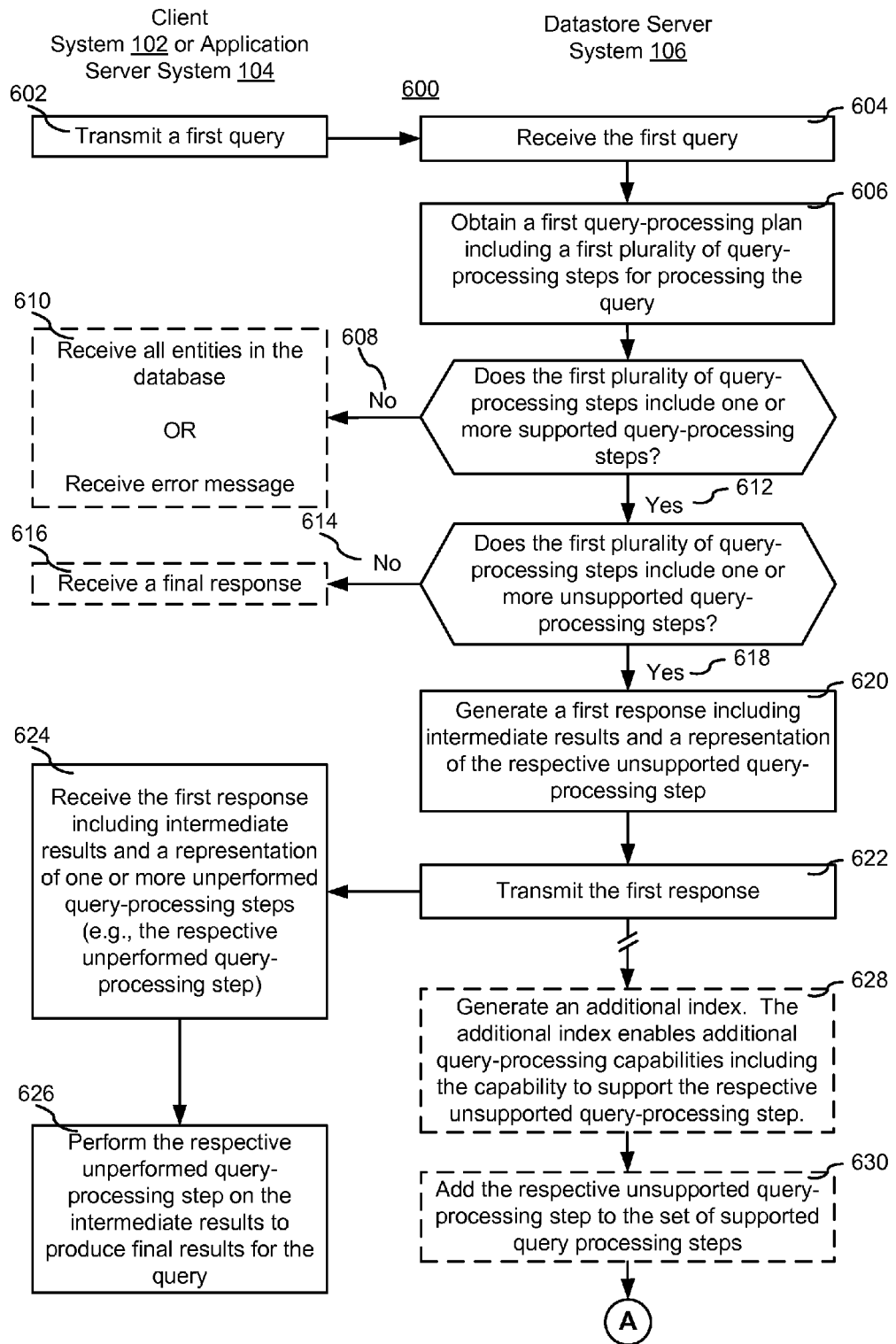
FIGS. 6A-6B include a flow chart illustrating a method for processing queries, in accordance with some embodiments.
Figure 6B:
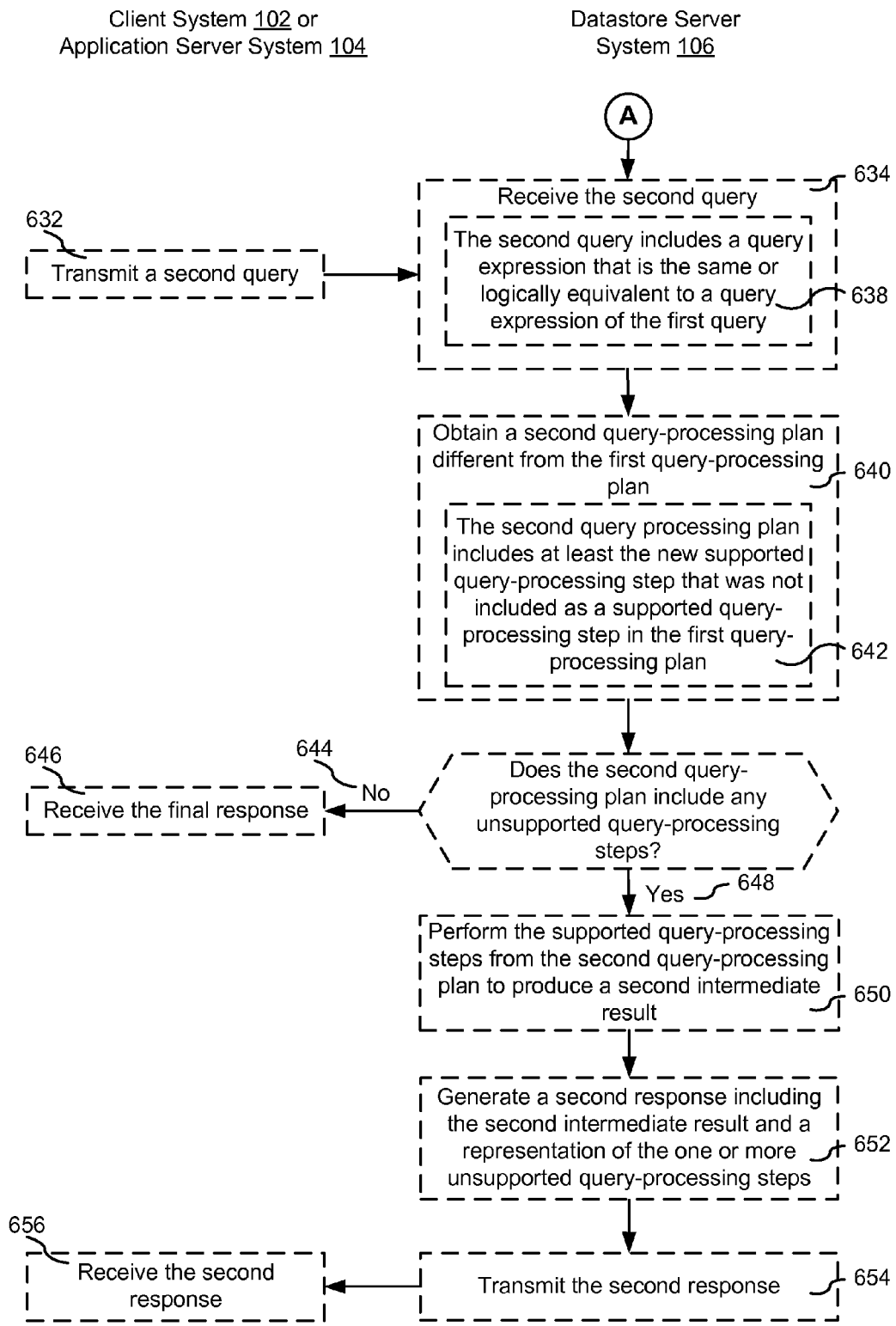
Figure 7A:
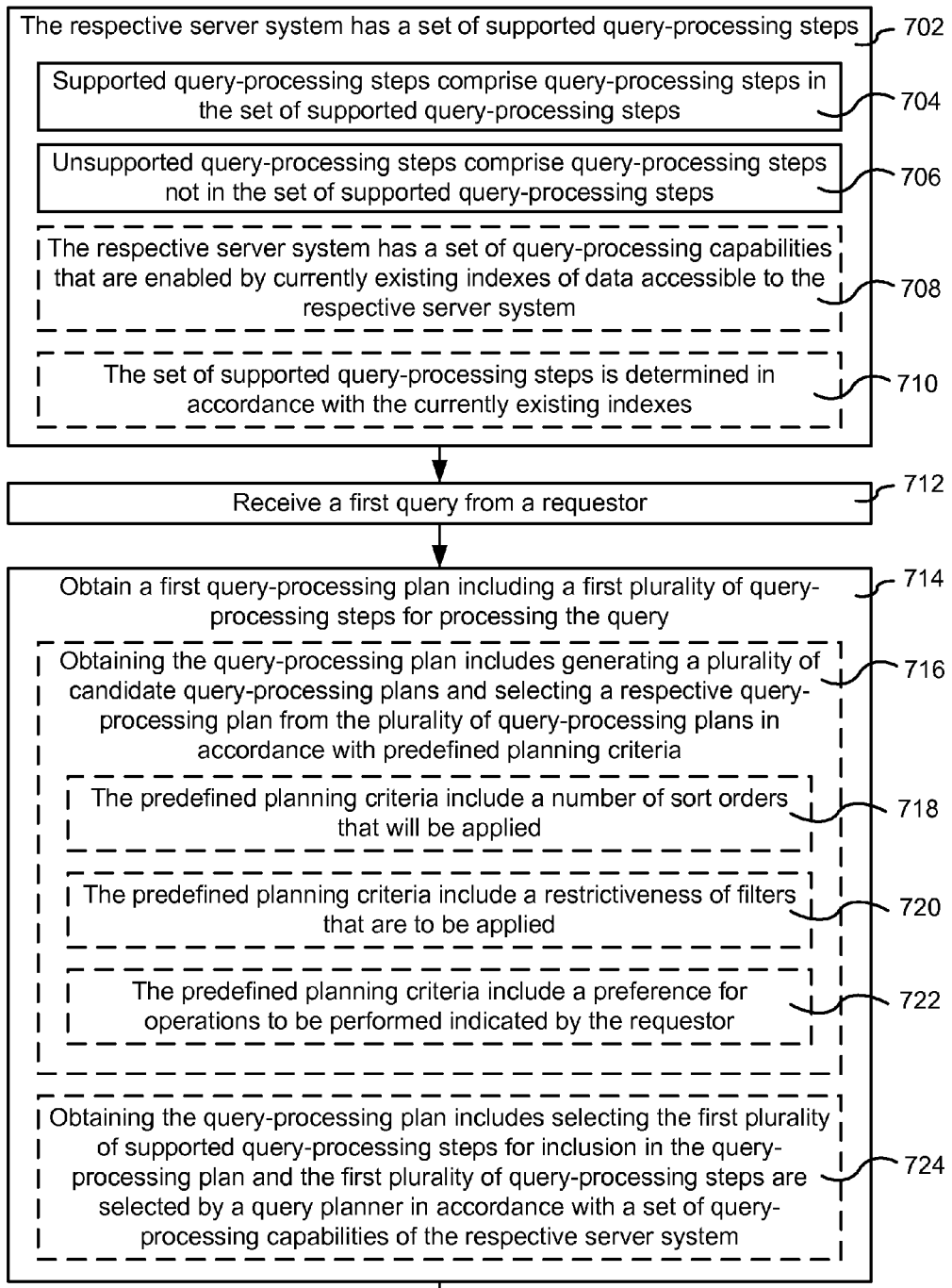
FIGS. 7A-7D include a flow chart illustrating a method for receiving and processing queries at a datastore server system and returning responses, in accordance with some embodiments.
Figure 7B:
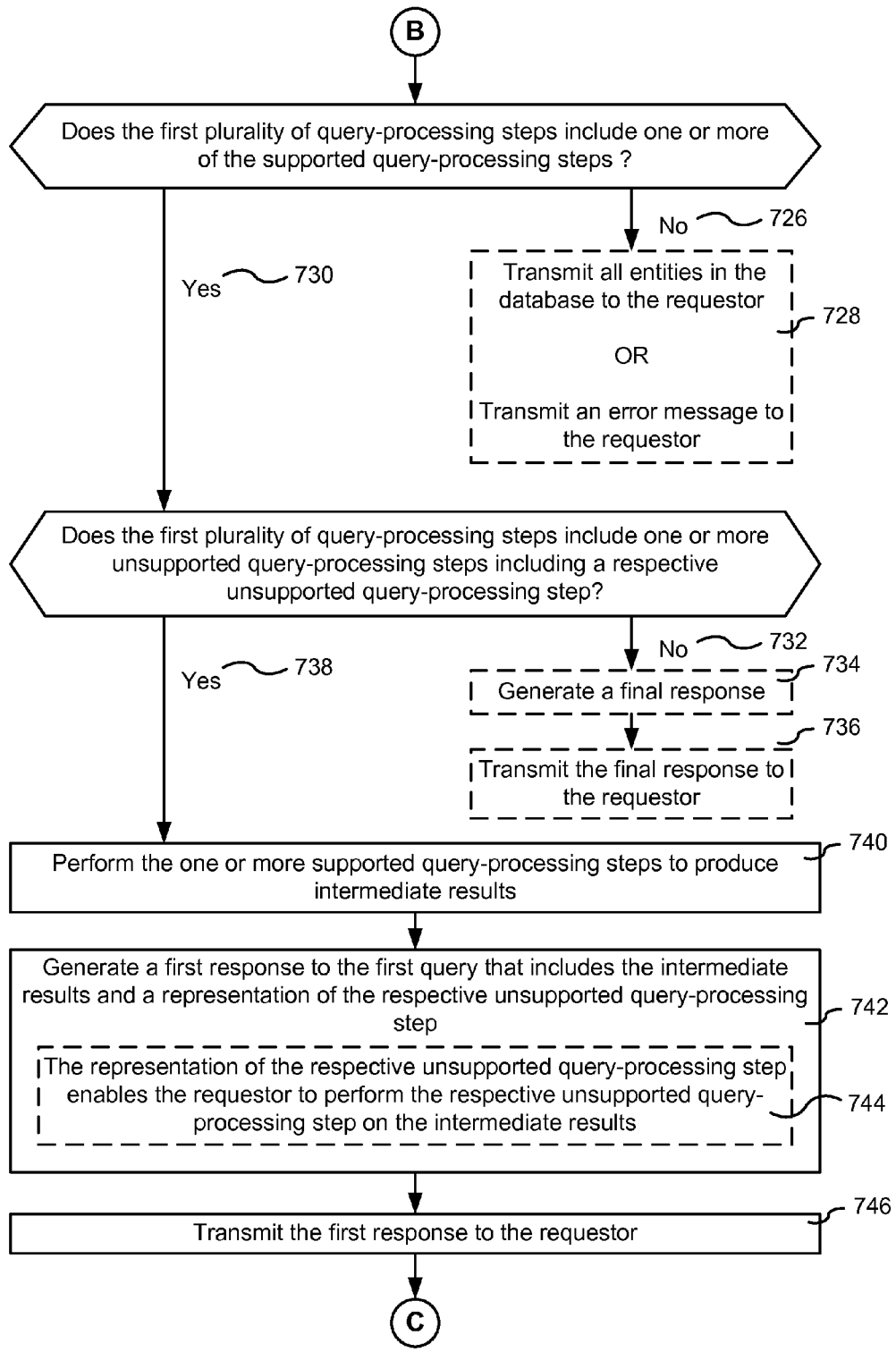
Figure 7C:
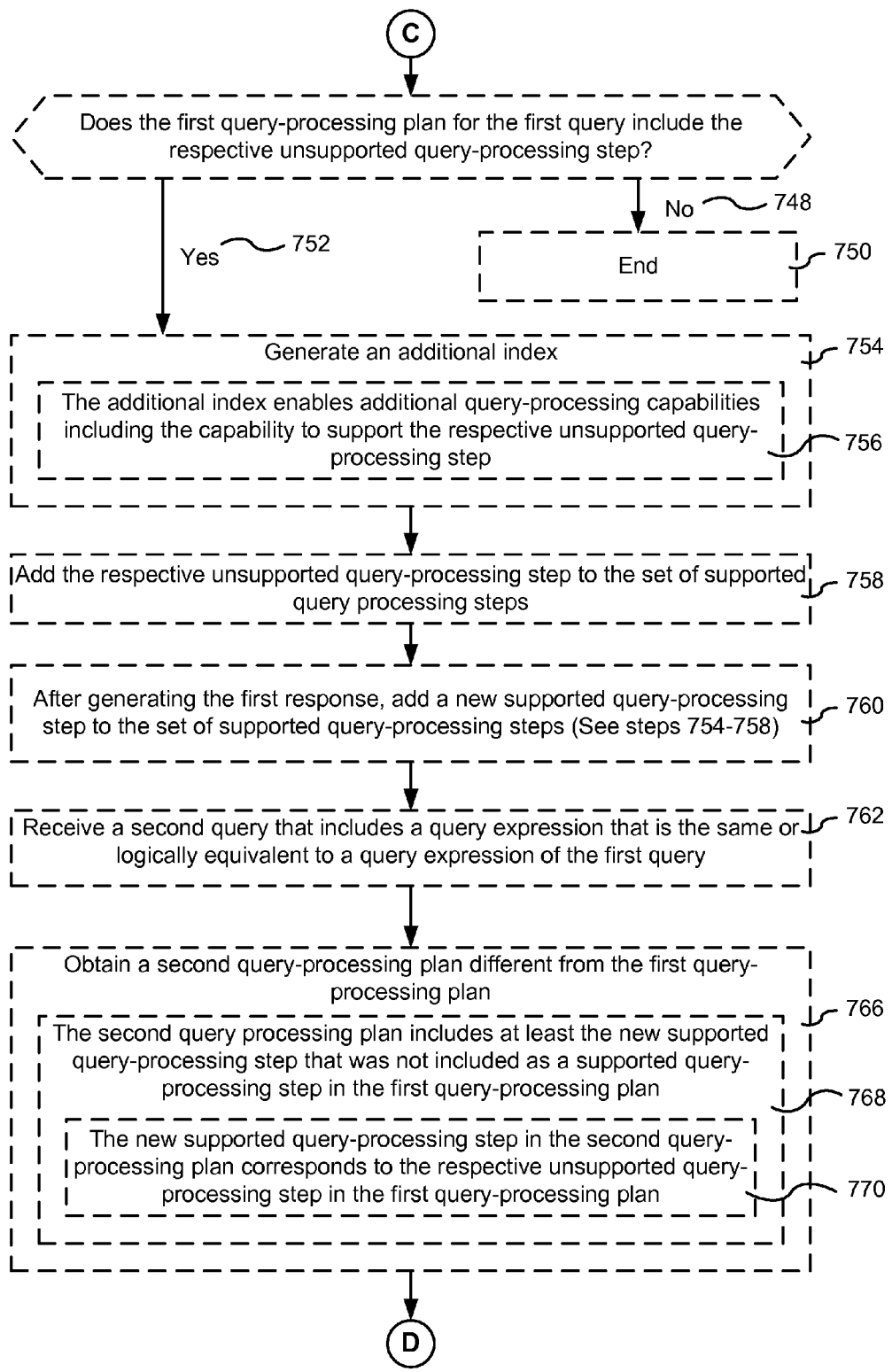
Figure 7D:
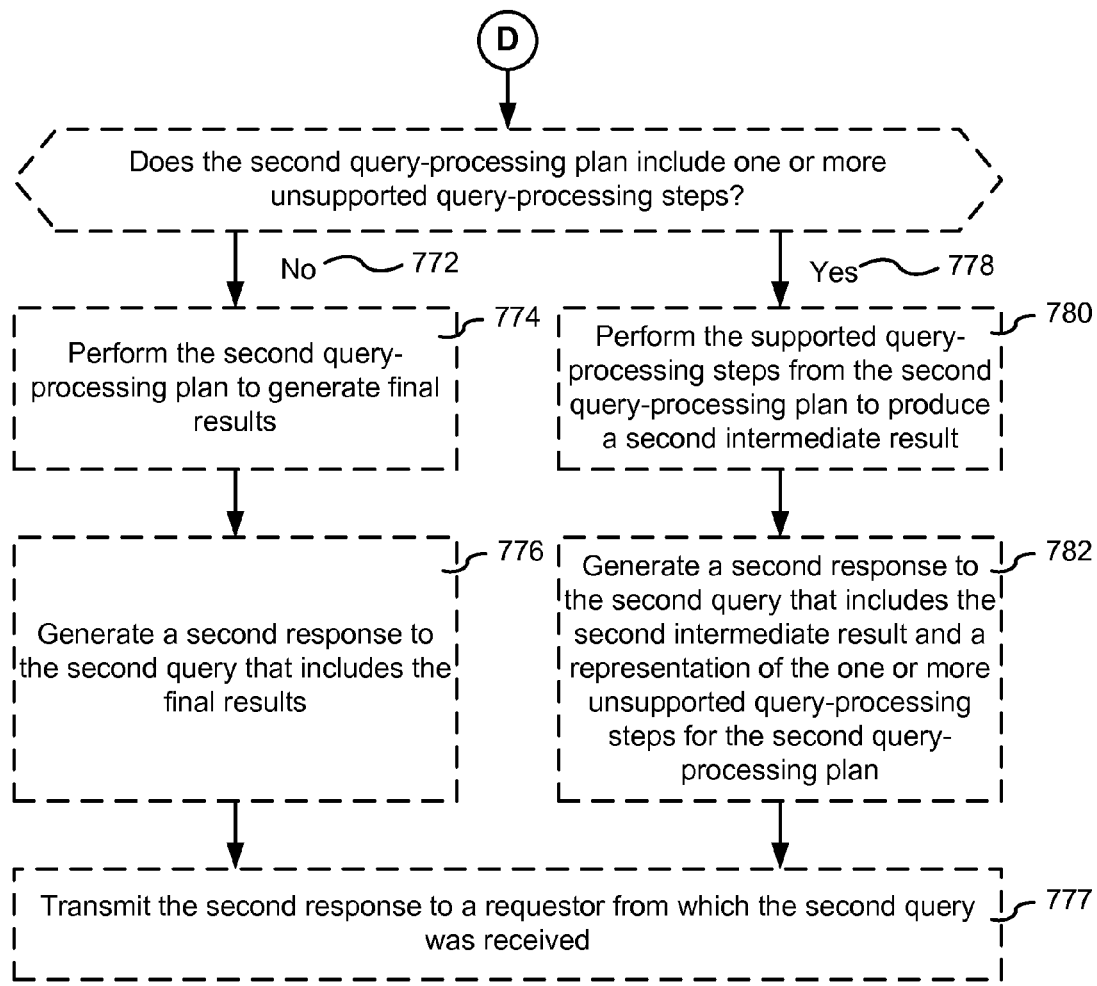

FIGS. 6A-6B include a flowchart representing a method 600 for receiving and processing queries from a requestor (e.g., Client 102, App Server 104), at Datastore Server 106 and returning responses to the queries, according to certain embodiments. Method 600 is, optionally, governed by instructions that are stored in a non-transitory computer readable storage medium and that are executed by one or more processors of one or more computer systems (e.g., Client 102, App Server 104 or Datastore Server 106). Each of the operations shown in FIGS. 6A-6B typically corresponds to instructions stored in a computer memory or non-transitory computer readable storage medium (e.g., memory 206 of Client 102 in FIG. 2, memory 306 of App Server 104 in FIG. 3 or memory 406 of Datastore Server 106 in FIG. 4). The computer readable storage medium optionally includes a magnetic or optical disk storage device, solid state storage devices such as Flash memory, or other non-volatile memory device or devices. The computer readable instructions stored on the computer readable storage medium optionally includes one or more of: source code, assembly language code, object code, or other instruction format that is interpreted or executed by one or more processors. In various embodiments, some operations in method 600 are, optionally, combined and/or the order of some operations are, optionally, changed from the order shown in FIGS. 6A-6B.

A requestor (e.g., Client 102 or App Server 104) transmits (602) a first query to Datastore Server 106 (e.g., "A=1 AND B=0, sort by C"). Datastore Server 106 receives (604) the first query. Datastore Server 106 obtains (606) a first query-processing plan, for example from Request Processor 124 (e.g., Query Planner 446), including a first plurality of query-processing steps for processing the query. Datastore Server 106 makes a determination as to whether the first plurality of query-processing steps includes one or more supported query-processing steps. In some implementations, upon determining that the first plurality of query-processing steps does not (608) include one or more supported query-processing steps, Datastore Server 106 transmits all entities in the database to the requestor or, alternatively, Datastore Server 106 transmits an error message to the requestor. The requestor receives (610) all entities in the database or alternatively, receives the error message. An advantage of providing all entities in the database is that the requestor can use this information to execute the query. However, in some circumstances, receiving all entities in the database (especially when all entities in the database correspond to a significant volume of data), will overwhelm the requestor (e.g., if the requestor does not have the capability to handle large volumes of data). In some implementations one of these options (e.g., return all entities in the database) is selected as a default which can be overridden if Datastore Server 106 determines that the other option (e.g., returning an error message) is more appropriate given the known capabilities of the requestor (e.g., that the requestor has a limited amount of memory that is smaller than the size of the data set including all entities in the database, or that the requestor has a slow network connection).

In contrast, upon determining that the first plurality of query-processing steps does (612) include one or more supported query-processing steps, Datastore Server 106 makes a determination as to whether the first plurality of query-processing steps includes one or more unsupported query-processing steps. If the first plurality of query-processing steps does not (614) include one or more unsupported query-processing steps (e.g., if Datastore Server 106 has indexes that enable the entire query to be executed efficiently at Datastore Server 106), Datastore Server 106 generates a final response and transmits the final response to the requestor. The requestor receives (616) the final response. In contrast, if the first plurality of query-processing steps does (618) include one or more unsupported query-processing steps (e.g., query-processing steps that cannot be efficiently executed at Datastore Server 106 using existing indexes), Datastore Server 106 generates (620) a first response including intermediate results and a representation of the respective unsupported query-processing step. As shown in the example in FIG. 5B, Query 550 includes Supported Step 551-*a* ((A AND B) sorted by Key) and Unsupported Step 552 (Sort by C). Consequently, Datastore Server 106 generates Response 553-*a* including Intermediate Result 554 (e.g., Keys 1, 4, and 5) and a representation of the unsupported query-processing step (in the example shown in FIG. 5B, Unsupported Step 552 (Sort by C)).

After generating the intermediate results and the representation of the respective unsupported query-processing step, Datastore Server 106 transmits (622) the first response to the requestor. The requestor receives (624) the first response including intermediate results and a representation of one or more unperformed query-processing steps (e.g., the respective unperformed query-processing step). The requestor performs (626) the respective unperformed query-processing step on the intermediate results to produce final results for the query. In the example shown in FIG. 5B, Datastore Server 106 transmits Response 553-*a* to the requestor, which receives Response 553-*a* including Intermediate Result 554 and Unsupported Step 552 (Sort by C). The requestor can then perform the unperformed query-processing step (in example in FIG. 5B, Unsupported Step 552 (Sort by C) to produce final results. In the example in FIG. 5B, the requestor would sort Intermediate Result 554 (in this example, Entities for Keys 1, 4, and 5) by C to produce a final result (Entities for Keys 4, 5, and 1).

In some embodiments, Datastore Server 106 generates (628) an additional index, wherein the additional index enables additional query-processing capabilities including the capability to support the respective unsupported query-processing step. In some embodiments, Datastore Server 106 adds (630) the respective unsupported query-processing step to the set of supported query processing steps. In the example shown in FIG. 5B, the query-processing step 'Sort by C' is not supported by the Indexes 142 (142-A, 142-B, and 142-C) in conjunction with or following the supported query-processing step 'A=1 AND B=0.' However, once Datastore Server 106 generates the additional Indexes 142 (Indexes 142-AC and 142-BC) shown in the example in FIG. 5C, the additional Indexes (Indexes 142-AC and 142-BC) enable additional query-processing capabilities including the capability to support the previously unsupported query-processing step (e.g., Unsupported Step 552 (Sort by C), shown in the example of FIG. 5B).

In some embodiments, the requestor transmits (632) a second query to Datastore Server 106. Datastore Server 106 receives (634) the second query. The second query includes (638) a query expression that is the same or logically equivalent to a query expression of the first query. In some embodiments, the second query and the first query are considered logically equivalent if they have the same logical content (e.g., if two operations performed on the same operands produce the same result, then the two operations are considered logically equivalent) or can be logically derived from one another. Some examples of logical equivalence (typically represented as '≡') are double negations (e.g., A ≡NOT(NOT (A))), commutativity of 'and' (e.g., A and B≡B and A) commutativity of 'or' (e.g., A or B≡B or A), associativity of 'and' (e.g., A and (B and C)≡(A and B) and C), associativity of 'or' (e.g., A or (B or C)≡(A or B) or C), De Morgan's laws (e.g., NOT(A or B)≡NOT(A) and NOT(B); NOT(A and B)≡NOT (A) or NOT(B)), contrapositivity (e.g., if A then B≡if NOT(B) then NOT(A)), etc. In other words, in some situations, if Datastore Server 106 receives essentially the same query at two different times, the results will, in some situations, differ from each other if new capabilities have been added to Datastore Server 106 (e.g., by generating new indexes that enable the new capabilities), as described in greater detail below.

Datastore Server 106 obtains (640) a second query-processing plan different from the first query-processing plan. The difference between the first and second query-processing plans might be that a query-processing step that was "unsupported" in the first query-processing plan is now "supported" in the second query-processing plan. The second query-processing plan includes (642) at least the new supported query-processing step that was not included as a supported query-processing step in the first query-processing plan. As described above, in the example shown in FIG. 5B, the query-processing step 'Sort by C' is not supported by the Indexes 142 (142-A, 142-B, and 142-C), according to the query-processing plan of FIG. 5B, in conjunction with or following the query-processing step 'A=1 AND B=0.' However, once Datastore Server 106 generates the additional Indexes 142 (Indexes 142-AC and 142-BC) shown in the example in FIG. 5C, the additional Indexes (Indexes 142-AC and 142-BC) enable additional query-processing capabilities including the addition of the previously unsupported query-processing step (e.g., Unsupported Step 552 (Sort by C), shown in the example of FIG. 5B) to the second query-processing plan.

In some embodiments, Datastore Server 106 makes a determination as to whether the second query-processing plan includes any unsupported query-processing steps. If the second query-processing plan does not (644) include any unsupported query-processing steps, Datastore Server 106 returns a final response. The requestor receives (646) the final response. In the example shown in FIG. 5C, since the query-processing plan includes only Supported Step 551-*b* and no unsupported query-processing step, Datastore Server 106 generates Response 553-*b* including Final Result 556. This result (Final Result 556) is different from the Intermediate Result 554 generated in the scenario demonstrated in FIG. 5B where the query is determined to include Unsupported Step 552 (Sort by C) due to the fact that, in the example shown in FIG. 5B, Datastore Server 106 does not have indexes that provide the capability to support Unsupported Step 552 (Sort by C). In contrast, if the second query-processing plan does (648) include any unsupported query-processing steps, Datastore Server 106 performs (650) the supported query-processing steps from the second query-processing plan to produce a second intermediate result, similar to the scenario described in FIG. 5B. Datastore Server 106 generates (652) a second response including the second intermediate result and a representation of the one or more unsupported query-processing steps. Datastore Server 106 transmits (654) the second response. The requestor receives (656) the second response. In many situations, when Datastore Server 106 has added new query processing capabilities, the second intermediate result will be different from the first intermediate result, even if the data at Datastore Server 106 has not changed, due to the fact that a new query processing capability was used to generate the second intermediate result that was not available when generating the first intermediate result.

It should be understood that the particular order in which the operations in FIGS. 6A-6B have been described are merely examples and are not intended to indicate that the described order is the only order in which the operations could be performed. One of ordinary skill in the art would recognize various ways to reorder the operations described herein. Additionally, it should be noted that details of other processes described herein with respect to methods 700 and 800 (described herein with reference to FIG. 7A-7D or 8 respectively) are also applicable in an analogous manner to method 600 described above with respect to FIGS. 6A-6B. For example, entities, indexes, index entries, queries, query-processing steps (supported and unsupported), responses, and results described above with reference to method 600 optionally have one or more of the characteristics of the various entities, indexes, index entries, queries, query-processing steps (supported and unsupported), responses, and results described herein with reference to methods 700 and 800. For brevity, these details are not repeated here.

Generating Responses to Queries Based on Supported Query-Processing Steps

FIGS. 7A-7D include a flowchart representing a method 700 for receiving and processing queries at a datastore server system and returning responses, according to certain embodiments. Method 700 is, optionally, governed by instructions that are stored in a non-transitory computer readable storage medium and that are executed by one or more processors of one or more servers (e.g., Datastore Server 106, FIG. 4). Each of the operations shown in FIGS. 7A-7D typically corresponds to instructions stored in a computer memory or non-transitory computer readable storage medium (e.g., memory 406 of Datastore Server 106 in FIG. 4). The computer readable storage medium optionally includes a magnetic or optical disk storage device, solid state storage devices such as Flash memory, or other non-volatile memory device or devices. The computer readable instructions stored on the computer readable storage medium optionally includes one or more of: source code, assembly language code, object code, or other instruction format that is interpreted or executed by one or more processors. In various embodiments, some operations in method 700 are, optionally, combined and/or the order of some operations are, optionally, changed from the order shown in FIGS. 7A-7D.

The respective server system (e.g., Datastore Server 106) has (702) a set of supported query-processing steps. Supported query-processing steps comprise (704) query-processing steps in the set of supported query-processing steps. Unsupported query-processing steps comprise (706) query-processing steps not in the set of supported query-processing steps.

In some embodiments, the determination as to whether a respective query-processing step is supported/unsupported is conditioned upon one or more query processing steps that precede the respective query-processing step in the query-processing plan. For example, under one set of circumstances sorting by A then B or sorting by B then C is supported, but sorting by A then B then C is not supported. In this example, sorting by C is supported if a prior step in the plan includes sorting by A or sorting by B, but sorting by C is not supported if prior steps in the plan include sorting by A then B. In some embodiments, sorting of results is performed as an integral part of retrieving results, and thus different sorting steps are not performed sequentially, rather the respective server system is either capable (e.g., has indexes that support) retrieving results sorted in a sort order, or it is not capable of doing so. Optionally, if a requested sort order (e.g., sort by A then B then C) is not supported, a portion of the requested sort order (e.g., sort by A then B) can be applied (as part of a supported query-processing step), while leaving the rest of the sorting (e.g., sorting by C) to be performed after the results have been retrieved (e.g., as part of an unsupported query-processing step).

In some embodiments, the respective server system has (708) a set of (preferred/resource-efficient) query-processing capabilities that are enabled by currently existing indexes of data accessible to the respective server system. In some embodiments, the respective server system uses a set of sorted indexes to retrieve sorted results efficiently. However, when a particular index that is needed to process a respective portion of a query efficiently is not present, then the query-processing capabilities of the respective server system do not include a capability to process the respective portion of the query efficiently. For example, when the requisite index(es) to process the respective portion of the query are present at the respective server system, the time to execute the query scales with the number of results retrieved rather than with the number of entries or entities searched (as would be the case absent the requisite index(es) at the respective server system), thereby making query-execution "efficient." In some embodiments, the set of supported query-processing steps is determined (710) in accordance with the currently existing indexes.

For example, as noted above with regard to the example shown in FIG. 5B, the query-processing step 'Sort by C' is not supported by the Indexes 142 (142-A, 142-B, and 142-C) in conjunction with or following the supported query-processing step 'A=1 AND B=0.' In other words, in the example shown in FIG. 5B, the query processing step 'Sort by C' in conjunction with or following the query-processing step 'A=1 AND B=0' is not included in the set of supported query-processing steps determined in accordance with the currently existing indexes (e.g., Indexes 142-A, 142-B, and 142-C). Consequently, in the example shown in FIG. 5B, the set of query-processing capabilities do not include a capability to process the query-step 'Sort by C' in conjunction with the query-processing step 'A=1 AND B=0.' However, once Datastore Server 106 generates the additional Indexes 142 (Indexes 142-AC, 142-BC, and 142-CA) as shown in the example in FIG. 5C, the additional Indexes (Indexes 142-AC, 142-BC, and 142-CA) enable additional query-processing capabilities including the capability to support the previously unsupported query-processing step (e.g., Unsupported Step 552 (Sort by C), shown in the example of FIG. 5B).

The respective server system receives (712) a first query from a requestor (e.g., Client 102 or App Server 104). In the examples shown in FIGS. 5B-5C, Datastore Server 106 receives Query 550 from a requestor (e.g., Client 102 or App Server 104). The respective server system obtains (714) a first query-processing plan including a first plurality of query-processing steps for processing the query. The process of obtaining a respective query-processing plan includes generating, identifying or selecting the respective query-processing plan. In some embodiments, a query-processing plan includes a set of steps (supported and unsupported) and an order in which the steps are to be executed (optionally, the supported steps all occur earlier in the order than the unsupported steps). In some implementations the supported steps are performed as part of an integrated operation that scans a set of one or more indexes for identifiers of matching entities, as described in greater detail above with reference to FIGS. 5B-5C. In some embodiments, information about what steps are supported and unsupported is not provided to potential requestors prior to receiving queries from the requestors, and thus the requestor from which the first query is received does not know a current set of supported/unsupported query processing steps prior to sending the first query to the respective server.

In some embodiments, obtaining the query-processing plan includes (716) generating a plurality of candidate query-processing plans and selecting a respective query-processing plan from the plurality of query-processing plans in accordance with predefined planning criteria. As explained above, query-processing steps are determined to be supported or unsupported in the context of a query-processing plan. A query-processing step that is supported in one query-processing plan could be unsupported in another query-processing plan. For example, if results are filtered by X, Y and Z, then the results can only be sorted by A. However, if results are only filtered by X, then results can be sorted by A, B and C.

In some embodiments, the predefined planning criteria include (718) a number of sort orders that will be applied (e.g., preferentially selecting query-processing plans that include applying all of the sort orders specified in the search query). In some embodiments, query plans that include more sort orders are preferred over query plans that include fewer sort orders. For example, if a query requires filtering by X, Y and Z, and sorting by A, B and C. Then query plans that include sorting steps (sorting by A, B, and C) are preferred over query plans that include all of the filtering steps but include fewer sorting steps (e.g., because sorting large sets of data can be a very resource-intensive operation). In some embodiments, query plans that include more filters are preferred over query plans that include fewer filters. For example, if a query requires filtering by X, Y and Z, and sorting by A, B and C. Then query plans that include filtering steps (sorting by X, Y, and Z) are preferred over query plans that include all of the sorting steps but include fewer filtering steps (e.g., because applying more filters can substantially reduce the result set, thereby making it more efficient to sort the intermediate results produced by performing the filtering steps).

In some embodiments, the predefined planning criteria include (720) a restrictiveness of filters that are to be applied (e.g., so as to reduce the size of the intermediate results). In some embodiments the respective server system preferentially selects query-processing plans that include applying a most restrictive filter to reduce the number of results returned if all orders specified in the search query cannot be applied. For example in a database with entities corresponding to cities having properties corresponding to 'Continent' and 'Temperature,' the requestor transmits a query 'Continent=North America,' 'Temperature<−40F.' In this scenario, Datastore Server 106 would benefit from preferentially performing the more restrictive query-processing step (in this case, 'Temperature<−40F') using an existing index sorted by 'Temperature,' in order to limit the number of results returned, so that the requestor will have a smaller set of entities included in the intermediate results on which to perform the unsupported query-processing step (e.g., 'Continent=North America').

In some embodiments, the predefined planning criteria include (722) a preference for operations (e.g., filter operations and/or sort operations) to be performed indicated by the requestor (preferentially applying query-processing plans that include performing processing operations that the requestor indicated were important, for example, in accordance with an order in which filters or sort orders are listed in the query). For example in a database with entities having properties corresponding to 'Age,' 'Occupation,' and 'Residence,' the requestor will, in some situations, explicitly indicate high priority to a 'Sort by Age' step or in some way indicate that the results to a query must always be sorted by 'Age.' In that scenario, Datastore Server 106 would select a query-processing plan where 'Sort by Age' is a supported query-processing step using existing Indexes sorted by 'Age.' Additionally, if Datastore Server 106 does not have Indexes sorted by age, Datastore Server 106 optionally generates Indexes sorted by 'Age' so that the query-processing step can be included as a supported query-processing step in future query-processing plans.

Obtaining the query-processing plan includes (724) selecting the first plurality of supported query-processing steps for inclusion in the query-processing plan and the first plurality of query-processing steps are selected by a query planner in accordance with a set of (preferred/resource-efficient) query-processing capabilities of the respective server system.

The respective server system makes a determination as to whether the first plurality of query-processing steps includes one or more of the supported query-processing steps. In some embodiments, if the first plurality of query-processing steps does not (726) include one or more of the supported query-processing steps, the respective server system returns (728) all entities in the database to the requestor or transmits an error message to the requestor. As described above with reference to FIGS. 6A-6B, returning all entities in the database to the requestor would give the requestor an opportunity or option to execute the query on the returned entities, but might also risk overwhelming the requestor with an excessive amount of data that the requestor is potentially incapable of handling. If the first plurality of query-processing steps does (730) include one or more of the supported query-processing steps, the respective server system makes a determination as to whether the first plurality of query-processing steps includes one or more unsupported query-processing steps including a respective unsupported query-processing step.

In some embodiments, if the first plurality of query-processing steps does not (732) include one or more of the unsupported query-processing steps, the respective server system generates (734) a final response. The respective server system transmits (736) the final response to the requestor. For example, in FIG. 5C, in the absence of an unsupported query-processing step, the respective server system generates Response 553-*b*, including Final Result 556 (e.g., Index Entities for Keys 4, 5, and 1).

In contrast, if the first plurality of query-processing steps does (738) include one or more of the unsupported query-processing steps, the respective server system performs (740) the one or more supported query-processing steps to produce intermediate results. The respective server system generates (742) a first response to the first query that includes the intermediate results and a representation of the respective unsupported query-processing step. While the following discussion is with respect to a single unsupported query-processing step, in some circumstances, the first query-processing plan includes a plurality of respective unsupported query-processing steps, which are handled in an analogous manner to the respective unsupported query-processing step described below (e.g., the first response includes a representation of the plurality of unsupported query-processing steps).

In some embodiments, the representation of the respective unsupported query-processing step includes an indication of any sort orders, filters and/or other query processing steps that have not yet been applied to the intermediate results. As shown in the example in FIG. 5B, Query 550 includes Supported Step 551-*a* ((A AND B) sorted by Key) and Unsupported Step 552 (Sort by C). Consequently, the respective server system generates Response 553-*a* including Intermediate Result 554 and a representation of the unsupported query-processing step (in the example shown in FIG. 5B, Unsupported Step 552). In some embodiments, the representation of the respective unsupported query-processing step enables (744) the requestor to perform the respective unsupported query-processing step on the intermediate results. In the example shown in FIG. 5B, the respective server system (e.g., Datastore Server 106) transmits Response 553-*a* to the requestor (e.g., Client 102 or App Server 104), which receives Response 553-*a* including Intermediate Result 554 and Unsupported Step 552 (Sort by C). Obtaining Intermediate Result 554 and Unsupported Step 552 would enable the requestor to then perform the unperformed query-processing step (in example in FIG. 5B, Unsupported Step 552) in order to produce final results. In the example shown in FIG. 5B, Intermediate Result 554 and Unsupported Step 552 would enable the requestor to sort Intermediate Result 554 by C to produce a final result (Entities for Keys 4, 5, and 1). After generating the first response, the respective server system transmits (746) the first response to the requestor (e.g., Client 102 or App Server 104).

In some embodiments, the respective server system makes a determination as to whether the first query-processing plan for the first query includes the respective unsupported query-processing step. Upon determining that the first query-processing plan for the first query includes (752) the respective unsupported query-processing step, the respective server system generates (754) an additional index. The respective server system could generate an additional index(es) to support one or more respective unsupported query-processing steps, for example, if the respective server system receives multiple queries that include the one or more respective unsupported query-processing steps. Due to the fact that generating a new index or set of indexes to support a new query-processing capability is a time-consuming process, this process is, in many situations, performed asynchronously with responding to a particular query. In other words, while a query-processing step in a particular query optionally triggers the process of generating a new index or set of indexes, Datastore Server 106 will, in many situations, generate a response to the query before completing generating the new index or set of indexes, and the new index or set of indexes will be available for processing future queries.

In some embodiments, the additional index enables (756) additional query-processing capabilities including the capability to support the respective unsupported query-processing step. The respective server system adds (758) the respective unsupported query-processing step to the set of supported query-processing steps. In the example shown in FIG. 5B, the query-processing step 'Sort by C' (namely, Unsupported Step 552) is not supported by the Indexes 142 (142-A, 142-B, and 142-C) in conjunction with or following the supported query-processing step 'A=1 AND B=0.' However, once the respective server system generates the additional Indexes 142 (e.g., Indexes 142-AC and 142-BC shown in the example in FIG. 5C), the additional Indexes (e.g., Indexes 142-AC and 142-BC) enable additional query-processing capabilities including the capability to support the previously unsupported query-processing step (e.g., Unsupported Step 552 (Sort by C), shown in the example of FIG. 5B).

In some embodiments, after generating the first response, in sequence, the respective server system adds (760) a new supported query-processing step to the set of supported query-processing steps (e.g., by adding a new index that supports efficient processing of a previously unsupported query processing step (see steps 754-758)); receives (762) a second query that includes a query expression that is the same or logically equivalent to a query expression of the first query; and obtains (766) a second query-processing plan different from the first query-processing plan. In some embodiments, the second query processing plan includes (768) at least the new supported query-processing step that was not included as a supported query-processing step in the first query-processing plan.

In some situations, the second query-processing plan also includes one or more unsupported query-processing steps. In the example shown in FIGS. 5A-5C, if Entity Database 140 further included Property D and the query (e.g., Query 550) further included a step 'Sort by D' then with the Indexes shown in FIGS. 5B and 5C, it would not be possible for the respective server system to perform the query-processing step 'Sort by D.' Thus, the query-processing plan would include at least the unsupported query-processing step 'Sort by D.'

In other situations, the second query-processing plan does not include any unsupported query-processing steps (e.g., because the newly supported query-processing step provides the respective server system with the capability to efficiently perform the steps in the second query-processing plan. In some implementations, the new supported query-processing step in the second query-processing plan corresponds to (770) the respective unsupported query-processing step in the first query-processing plan. As described previously, in the example shown in FIG. 5B, the query-processing step 'Sort by C' (namely, Unsupported Step 552) is not supported by the Indexes 142 (142-A, 142-B, and 142-C), according to the query-processing plan of FIG. 5B, in conjunction with or following the query-processing step 'A=1 AND B=0.' However, once the respective server system generates the additional Indexes 142 (Indexes 142-AC, 142-BC, and 142-CA) shown in the example in FIG. 5C, the additional Indexes (Indexes 142-AC, 142-BC, and 142-CA) enable additional query-processing capabilities including the addition of the previously unsupported query-processing step (e.g., Unsupported Step 552 (Sort by C), shown in the example of FIG. 5B) to the second query-processing plan (e.g., the query-processing plan of FIG. 5C).

In some embodiments, the respective server system makes a determination as to whether the second query-processing plan does not include any unsupported query-processing steps. Upon determining that the second query-processing plan does not (772) include any unsupported query-processing steps, the respective server system performs (774) the second query-processing plan to generate final results and generates (776) a second response to the second query that includes the final results. After generating the final results, Datastore Server transmits (777) the second response (e.g., including the final results) to a requestor from which the second query was received. In the example shown in FIG. 5C, since the query-processing plan includes only Supported Step 551-*b* and no unsupported query-processing step, the respective server system generates Response 553-*b* including Final Result 556. In contrast, upon determining that the second query-processing plan does (778) include any unsupported query-processing steps, the respective server system performs (780) the supported query-processing steps from the second query-processing plan to produce a second intermediate result (e.g., different from the first intermediate result). The respective server system generates (782) a second response to the second query that includes the second intermediate result and a representation of the one or more unsupported query-processing steps (e.g., 'Sort by D') for the second query-processing plan. After generating the second intermediate result, the respective server system transmits (777) the second response (e.g. including the second intermediate result and a representation of the one or more unsupported query-processing steps) to a requestor from which the second query was received. In some situations, the same requestor transmits both the first query and the second query to the respective server system. In other situations, different requestors transmit the first and second queries to the respective server system (e.g., a first requestor transmits the first query and a second requestor transmits the second query).

It should be understood that the particular order in which the operations in FIGS. 7A-7D have been described are merely examples and are not intended to indicate that the described order is the only order in which the operations could be performed. One of ordinary skill in the art would recognize various ways to reorder the operations described herein. Additionally, it should be noted that details of other processes described herein with respect to methods 600 and 800 (described herein with reference to FIG. 6A-6B or 8 respectively) are also applicable in an analogous manner to method 700 described above with respect to FIGS. 7A-7D. For example, entities, indexes, index entries, queries, query-processing steps (supported and unsupported), responses, and results described above with reference to method 700 optionally have one or more of the characteristics of the various entities, indexes, index entries, queries, query-processing steps (supported and unsupported), responses, and results described herein with reference to methods 600 and 800. For brevity, these details are not repeated here.

Transmitting Queries from a Client or Application Server System

Figure 8:
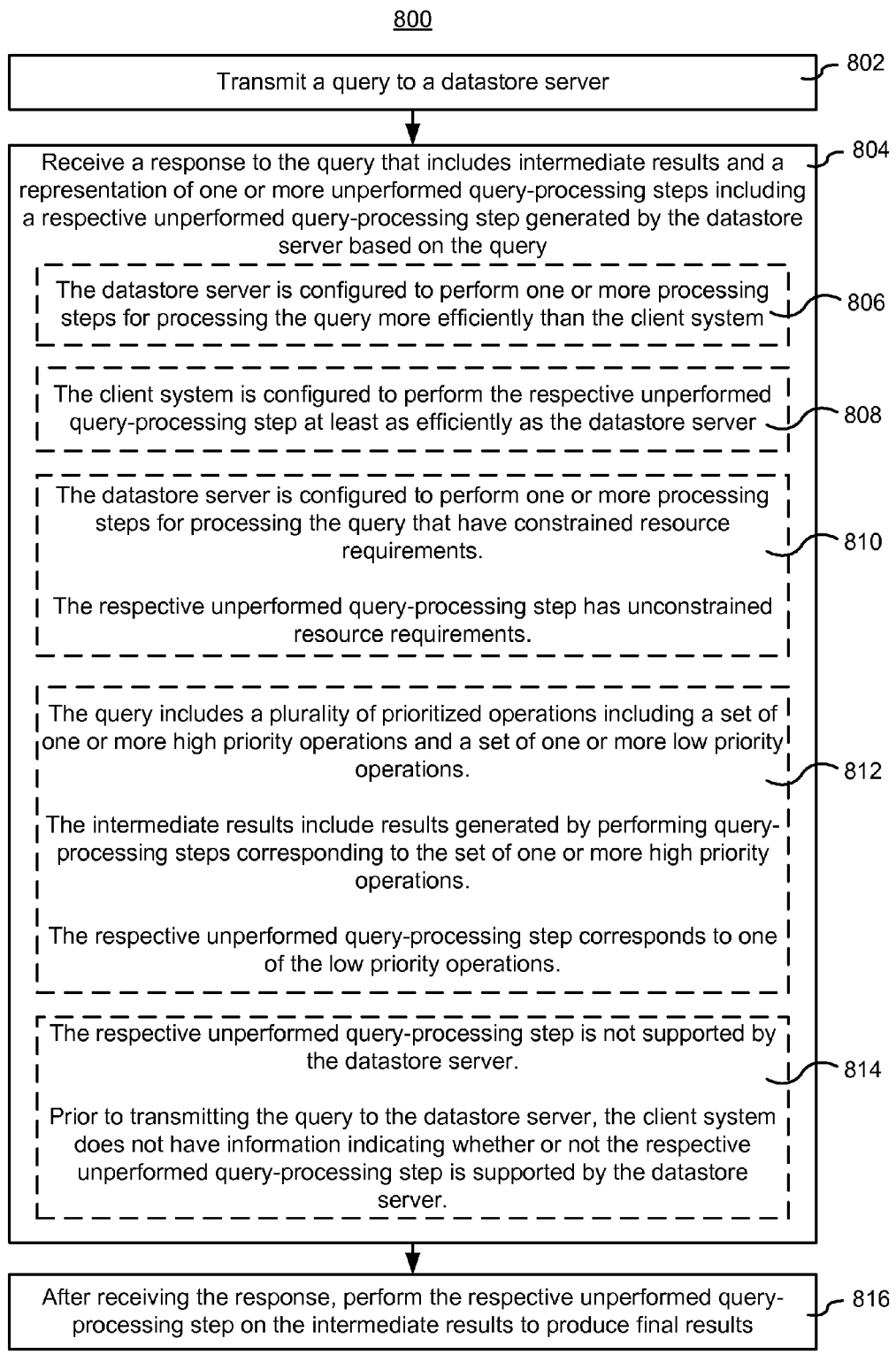
FIG. 8 includes a flow chart illustrating a method for transmitting queries from a client or application server system and receiving responses, in accordance with some embodiments.

FIG. 8 includes a flowchart representing a method 800 transmitting queries from a client or application server system and receiving responses, according to certain embodiments. Method 800 is, optionally, governed by instructions that are stored in a non-transitory computer readable storage medium and that are executed by one or more processors of one or more servers (e.g., App Server 104, FIG. 3). Each of the operations shown in FIG. 8 typically corresponds to instructions stored in a computer memory or non-transitory computer readable storage medium (e.g., memory 306 of App Server 104 in FIG. 3). The computer readable storage medium optionally includes a magnetic or optical disk storage device, solid state storage devices such as Flash memory, or other non-volatile memory device or devices. The computer readable instructions stored on the computer readable storage medium optionally includes one or more of: source code, assembly language code, object code, or other instruction format that is interpreted or executed by one or more processors. In various embodiments, some operations in method 800 are, optionally, combined and/or the order of some operations are, optionally, changed from the order shown in FIG. 8.

A requestor (e.g., Client 102 or App Server 104) transmits (802) a query to a datastore server (e.g., Datastore Server 106). For example, in FIGS. 5B-5C, Query 550 (A=1 AND B=0, Sort by C) is, optionally, transmitted by a requestor to Datastore Server 106. In some situations Client 102 communicates requests directly to Datastore Server 106. In other situations, Client 102 communicates with a backend application at App Server 104 and App Server 104 acts as an intermediary and sends requests to Datastore Server 106 on behalf of Client 102.

The requestor receives (804) a response to the query that includes intermediate results and a representation of one or more unperformed query-processing steps including a respective unperformed query-processing step generated by Datastore Server 106 based on the query (e.g., based on analysis of the query by Datastore Server 106). For example, as shown in FIG. 5B, the requestor receives Response 553-*a* to Query 550, which includes Intermediate Result 554 (Keys 1, 4, and 5) and Unsupported Step 552 (Sort by C).

In some embodiments, Datastore Server 106 is configured (806) to perform one or more processing steps for processing the query more efficiently than the requestor. For example, as shown in the entity-index configuration of FIG. 5A-5C, Datastore Server 106 can perform searches across large datasets efficiently due to the presence of Indexes 142 to support complex searches across large quantities of data entities. In some embodiments, the requestor is configured (808) to perform the respective unperformed query-processing step at least as efficiently as Datastore Server 106. For example, a sorting step (e.g., Unsupported Step 552 (Sort by C), in the example shown in FIG. 5B) would require both the requestor and Datastore Server 106 to pull the data to be sorted into memory and perform the sorting step using known, established techniques. Consequently, the requestor would be at least as efficient as Datastore Server 106 at performing a sorting step. In other words, performing the sorting step would take approximately the same amount of computational-resources at the requestor or at Datastore Server 106. In this instance, efficiency is independent of available computational resources (e.g., even if Datastore Server 106 has faster memory or more processing power than the requestor, and thus can perform the unsupported query-processing step faster than the requestor, Datastore Server 106 is not necessarily any more efficient at performing the query-processing step if the processing requires approximately the same number of compute cycles).

In some embodiments, Datastore Server 106 is configured (810) to perform one or more processing steps for processing the query that have constrained resource requirements, as described in greater detail above with reference to method 700 (e.g., steps 714-740) and the respective unperformed query-processing step has unconstrained resource requirements. For example, the one or more processing steps would require a known amount of processing power that can be calculated a-priori (e.g., in the examples shown in FIG. 5B, the cost of performing Supported Step 551-*a* using Index A 142-A and Index B 142-B would scale with the number of results retrieved rather that the number of data items, or index entries, searched). In contrast, when the unperformed query-processing step has unconstrained resource requirements, the unperformed query-processing step will use an unknown amount of processing power that cannot be calculated a-priori. For instance, in the example shown in FIG. 5B, Datastore Server 106 would not be able to calculate a-priori the amount of power required to execute Unsupported Step 552 (Sort by C) using the existing Indexes 142. In other words, Datastore Server 106 will not perform query-processing steps that might cause Datastore Server 106 to be overwhelmed or overloaded (or place an excessive demand on its resources, such as processing power, time, memory etc.) or that will degrade the ability of Datastore Server 106 to enforce isolation across requests (e.g., reducing the impact of any one request on other requests by Datastore Server 106 by preventing the request from monopolizing the resources of Datastore Server 106).

In some embodiments, the query includes (812) a plurality of prioritized operations including a set of one or more high priority operations and a set of one or more low priority operations. The intermediate results include results generated by performing query-processing steps corresponding to the set of one or more high priority operations. The respective unperformed query-processing step corresponds to one of the low priority operations. In other words, in some implementations, the requestor can prioritize operations included in the query to influence the decision by Datastore Server 106 as to which operations to include in the query processing plan as supported query-processing steps if the query is not fully supported. Thus, when the operations are prioritized, Datastore Server 106 will, in many situations, select a low priority (or the lowest priority) operation as one of the unsupported query-processing steps.

In some embodiments, the respective unperformed query-processing step is not supported (814) by Datastore Server 106 (e.g., the unperformed query-processing step described herein is one of the unsupported query-processing steps described above with reference to method 700). Prior to transmitting the query to Datastore Server 106, the requestor does not have information indicating whether or not the respective unperformed query-processing step is supported by Datastore Server 106. In many situations, the query-processing capabilities of Datastore Server 106 are not constant, but rather in flux due to the frequent addition of indexes at Datastore Server 106 that enable previously unsupported query-processing capabilities. As a result, in general, the requestor would not have information indicating whether or not a certain query-processing step is supported by Datastore Server 106 based on the current query-processing capabilities of Datastore Server 106.

After receiving the response, the requestor performs (816) the respective unperformed query-processing step on the intermediate results to produce final results for the query. In some embodiments, the respective unperformed query-processing step is a query-processing step that is not in a set of supported query processing steps that are supported by Datastore Server 106. Although receiving an unperformed query-processing step from Datastore Server 106 in response to a query nominally creates more work for the requestor, there are a number of advantages over possible alternatives. As one alternative when Datastore Server 106 is unable to perform any portion of a query transmitted by a requestor, Datastore Server 106 returns exceptions (errors or no results). This alternative provides no information other than that the query is not supported and thus leaves the requestor to determine how the query should be changed to get some results. As another alternative when Datastore Server 106 is unable to perform any portion of a query transmitted by a requestor, Datastore Server 106 returns all entities to the requestor to allow the requestor to perform the entire query. This alternative provides an overload of information to the requestor and does not leverage the specialized capabilities of Datastore Server 106 to perform some portions of the query efficiently. In comparison with these two alternatives, the method described herein (performing part of the query at Datastore Server 106 and returning intermediate results along with a representation of the unperformed query-processing step) enables the requestor to arrive at a final response (by executing only the unperformed query-processing step(s) on the intermediate results), without having to perform the entire query, thereby providing substantial gains in efficiency for the requestor.

It should be understood that the particular order in which the operations in FIG. 8 have been described are merely examples and are not intended to indicate that the described order is the only order in which the operations could be performed. One of ordinary skill in the art would recognize various ways to reorder the operations described herein. Additionally, it should be noted that details of other processes described herein with respect to methods 600 and 700 (described herein with reference to FIG. 6A-6B or 7A-7D respectively) are also applicable in an analogous manner to method 800 described above with respect to FIG. 8. For example, the entities, indexes, index entries, queries, query-processing steps (supported and unsupported), responses, and results described above with reference to method 800 optionally have one or more of the characteristics of the various entities, indexes, index entries, queries, query-processing steps (supported and unsupported), responses, and results described herein with reference to methods 600 and 700. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a respective server system having one or more processors and memory storing one or more programs that when executed by the one or more processors cause the respective server system to perform the method, the method comprising:
receiving a first query from a requestor;
obtaining a first query-processing plan including a first plurality of query-processing steps for processing the query, wherein:
the respective server system has a set of supported query-processing steps;
supported query-processing steps comprise query-processing steps in the set of supported query-processing steps; and
unsupported query-processing steps comprise query-processing steps not in the set of supported query-processing steps;
in accordance with a determination that the first plurality of query-processing steps includes one or more of the supported query-processing steps and one or more unsupported query-processing steps including a respective unsupported query-processing step:
performing the one or more supported query-processing steps to produce intermediate results; and
generating a first response to the first query that includes the intermediate results and a representation of the respective unsupported query-processing step; and
transmitting the first response to the requestor.

2. The method of claim 1, wherein the representation of the respective unsupported query-processing step enables the requestor to perform the respective unsupported query-processing step on the intermediate results.

3. The method of claim 1, wherein obtaining the query-processing plan includes generating a plurality of candidate query-processing plans and selecting a respective query-processing plan from the plurality of query-processing plans in accordance with predefined planning criteria.

4. The method of claim 3, wherein the predefined planning criteria include a criterion selected from the set consisting of:
a number of sort orders that will be applied;
a restrictiveness of filters that are to be applied; and
a preference for operations to be performed indicated by the requestor.

5. The method of claim 1, wherein obtaining the query-processing plan includes selecting the first plurality of supported query-processing steps for inclusion in the query-processing plan and the first plurality of query-processing steps are selected by a query planner in accordance with a set of query-processing capabilities of the respective server system.

6. The method of claim 1, further comprising, after generating the first response, in sequence:
adding a new supported query-processing step to the set of supported query-processing steps;

receiving a second query, wherein the second query includes a query expression that is the same or logically equivalent to a query expression of the first query; and obtaining a second query-processing plan different from the first query-processing plan, wherein the second query processing plan includes at least the new supported query-processing step that was not included as a supported query-processing step in the first query-processing plan.

7. The method of claim 6, wherein the new supported query-processing step in the second query-processing plan corresponds to the respective unsupported query-processing step in the first query-processing plan.

8. The method of claim 6, further comprising, in accordance with a determination that the second query-processing plan does not include any unsupported query-processing steps:

performing the second query-processing plan to generate final results;

generating a second response to the second query that includes the final results; and transmitting the second response to a requestor from which the second query was received.

9. The method of claim 6, further comprising, in accordance with a determination that the second query-processing plan includes one or more unsupported query-processing steps:

performing the supported query-processing steps from the second query-processing plan to produce a second intermediate result;

generating a second response to the second query that includes the second intermediate result and a representation of the one or more unsupported query-processing steps for the second query-processing plan; and transmitting the second response to a requestor from which the second query was received.

10. The method of claim 1, wherein:

the respective server system has a set of query-processing capabilities that are enabled by currently existing indexes of data accessible to the respective server system; and the set of supported query-processing steps is determined in accordance with the currently existing indexes.

11. The method of claim 10, further comprising, in response to determining that the first query-processing plan for the first query includes the respective unsupported query-processing step:

generating an additional index, wherein the additional index enables additional query-processing capabilities including the capability to support the respective unsupported query-processing step; and adding the respective unsupported query-processing step to the set of supported query processing steps.

12. A server system, comprising:

one or more processors;

memory; and one or more programs, wherein the one or more programs are stored in the memory and configured to be executed by the one or more processors, the one or more programs including instructions for:

receiving a first query from a requestor;

obtaining a first query-processing plan including a first plurality of query-processing steps for processing the query, wherein:

the respective server system has a set of supported query-processing steps;

supported query-processing steps comprise query-processing steps in the set of supported query-processing steps; and unsupported query-processing steps comprise query-processing steps not in the set of supported query-processing steps;

in accordance with a determination that the first plurality of query-processing steps includes one or more of the supported query-processing steps and one or more unsupported query-processing steps including a respective unsupported query-processing step:

performing the one or more supported query-processing steps to produce intermediate results; and generating a first response to the first query that includes the intermediate results and a representation of the respective unsupported query-processing step; and transmitting the first response to the requestor.

13. The server system of claim 12, wherein the representation of the respective unsupported query-processing step enables the requestor to perform the respective unsupported query-processing step on the intermediate results.

14. The server system of claim 12, wherein obtaining the query-processing plan includes generating a plurality of candidate query-processing plans and selecting a respective query-processing plan from the plurality of query-processing plans in accordance with predefined planning criteria.

15. The server system of claim 12, wherein:

the server system has a set of query-processing capabilities that are enabled by currently existing indexes of data accessible to the server system; and the set of supported query-processing steps is determined in accordance with the currently existing indexes.

16. The server system of claim 15, wherein the one or more programs further comprise instructions, which when executed by the server system, cause the server system to:

in response to determining that the first query-processing plan for the first query includes the respective unsupported query-processing step:

generate an additional index, wherein the additional index enables additional query-processing capabilities including the capability to support the respective unsupported query-processing step; and add the respective unsupported query-processing step to the set of supported query processing steps.

17. A non-transitory computer readable storage medium storing one or more programs, the one or more programs comprising instructions, which when executed by a server system with one or more processors, cause the server system to:

receive a first query from a requestor;

obtain a first query-processing plan including a first plurality of query-processing steps for processing the query, wherein:

the server system has a set of supported query-processing steps;

supported query-processing steps comprise query-processing steps in the set of supported query-processing steps; and unsupported query-processing steps comprise query-processing steps not in the set of supported query-processing steps;

in accordance with a determination that the first plurality of query-processing steps includes one or more of the supported query-processing steps and one or more unsupported query-processing steps including a respective unsupported query-processing step:
    perform the one or more supported query-processing steps to produce intermediate results; and
    generate a first response to the first query that includes the intermediate results and a representation of the respective unsupported query-processing step; and
transmit the first response to the requestor.

18. The computer readable storage medium of claim 17, wherein the representation of the respective unsupported query-processing step enables the requestor to perform the respective unsupported query-processing step on the intermediate results.

19. The computer readable storage medium of claim 17, wherein obtaining the query-processing plan includes generating a plurality of candidate query-processing plans and selecting a respective query-processing plan from the plurality of query-processing plans in accordance with predefined planning criteria.

20. The computer readable storage medium of claim 17, wherein:
    the server system has a set of query-processing capabilities that are enabled by currently existing indexes of data accessible to the server system; and
    the set of supported query-processing steps is determined in accordance with the currently existing indexes.

21. The computer readable storage medium of claim 20, wherein the one or more programs further comprise instructions, which when executed by a server system with one or more processors, cause the server system to:
    in response to determining that the first query-processing plan for the first query includes the respective unsupported query-processing step:
        generate an additional index, wherein the additional index enables additional query-processing capabilities including the capability to support the respective unsupported query-processing step; and
        add the respective unsupported query-processing step to the set of supported query processing steps.

* * * * *